(12) United States Patent
Hall

(10) Patent No.: US 10,777,056 B2
(45) Date of Patent: Sep. 15, 2020

(54) MOBILE STORAGE, TRACKING AND SECURITY SYSTEM AND METHOD THEREOF

(71) Applicant: JS2 System Solutions LLC, Centerburg, OH (US)

(72) Inventor: Kevin Mark Hall, Westerville, OH (US)

(73) Assignee: JS2 LOGISTIC SOLUTIONS, LLC, Westerville, OH (US)

(*) Notice: Subject to any disclaimer, the term of this patent is extended or adjusted under 35 U.S.C. 154(b) by 0 days.

(21) Appl. No.: 16/042,202

(22) Filed: Jul. 23, 2018

(65) Prior Publication Data

US 2019/0172331 A1 Jun. 6, 2019

Related U.S. Application Data

(60) Provisional application No. 62/594,712, filed on Dec. 5, 2017.

(51) Int. Cl.
| | |
|---|---|
| *G06Q 30/00* | (2012.01) |
| *G08B 13/24* | (2006.01) |
| *H04W 4/029* | (2018.01) |
| *G06K 7/10* | (2006.01) |

(52) U.S. Cl.
CPC ..... *G08B 13/2451* (2013.01); *G06K 7/10445* (2013.01); *H04W 4/029* (2018.02)

(58) Field of Classification Search
CPC ............. G06Q 10/087; G06Q 10/0875; G06K 17/0025; G06K 17/0029

USPC .................... 235/385, 492, 462.46
See application file for complete search history.

(56) References Cited

U.S. PATENT DOCUMENTS

| | | | |
|---|---|---|---|
| 5,745,036 A | 4/1998 | Clare | |
| 7,086,558 B1* | 8/2006 | Pixley | G07F 11/62 221/2 |
| 7,317,393 B2* | 1/2008 | Maloney | G07C 9/00103 340/568.1 |
| 7,337,963 B2 | 3/2008 | Harper et al. | |
| 7,371,977 B1 | 5/2008 | Preonas | |
| 8,570,169 B2 | 10/2013 | Green et al. | |
| 8,686,831 B2 | 4/2014 | Green et al. | |
| 9,123,224 B2 | 9/2015 | Hall et al. | |
| 2001/0035410 A1 | 11/2001 | Taube et al. | |
| 2002/0089434 A1* | 7/2002 | Ghazarian | G06Q 10/08 340/988 |
| 2004/0150525 A1 | 8/2004 | Wilson et al. | |
| 2004/0164864 A1 | 8/2004 | Chung et al. | |

(Continued)

*Primary Examiner* — Daniel St Cyr
(74) *Attorney, Agent, or Firm* — Taft Stettinius & Hollister LLP; Stephen F. Rost

(57) ABSTRACT

A portable asset dispensing device includes a container configured to be moved to a plurality of locations, an interior and an end. A door is positioned at the end of the container and includes a locking mechanism. A security access device is disposed at the end and configured to accept access information, and a controller controls access into the container and tracks a plurality of items within the interior of the container. The device includes a plurality of radio frequency identification (RFID) readers disposed within the interior of the container, the plurality of RFID readers being configured to detect RFID tags located on the plurality of items within the interior of the container and communicate the items to the controller.

20 Claims, 19 Drawing Sheets

(56) References Cited

U.S. PATENT DOCUMENTS

| | | |
|---|---|---|
| 2006/0103520 A1 | 5/2006 | Clark |
| 2006/0107614 A1 | 5/2006 | Slagel |
| 2007/0018826 A1 | 1/2007 | Nowak et al. |
| 2007/0108273 A1* | 5/2007 | Harper ................ G06Q 10/087 235/382 |
| 2008/0165013 A1* | 7/2008 | Harper ................ G06Q 10/087 340/572.8 |
| 2009/0033154 A1 | 2/2009 | Linkhart |
| 2011/0106681 A1 | 5/2011 | Cockerell et al. |

* cited by examiner

MULTI SHOPPER MODE: ENTERING WAREHOUSE

MULTI SHOPPER MODE: EXITING WAREHOUSE

MOBILE STORAGE, TRACKING AND SECURITY SYSTEM AND METHOD THEREOF

RELATED APPLICATIONS

This application claims the benefit of U.S. Provisional Patent Application Ser. No. 62/594,712, filed Dec. 5, 2017, the disclosure of which is hereby incorporated by reference in its entirety.

FIELD OF THE DISCLOSURE

The present disclosure relates to monitoring and tracking objects and items, and in particular, to systems, devices and methods for monitoring and tracking objects within a controlled environment.

BACKGROUND

Companies typically have difficulties tracking inventory items and their usage while on jobsites. Many inventory items are misused, misplaced, and improperly tracked and replenished by the employees of the companies. Therefore, companies have incentives to track the items, hold employees responsible for missing items, properly account costs, and replenish the missing items based on demand. Typically items of the inventory are kept in a controlled space that is monitored. Some companies have used locking doors with keypads that allow only employees with an authorized code to enter the controlled space. In addition, computers and bar code tags have been used to track the items in and out of the controlled space. However, these systems still lack automatic tracking information, cost accounting information, security methods, and replenishment information in the process of tracking and monitoring the items stored in the controlled space and linking the responsible employee with the items being taken in and out of the controlled space.

Therefore there is a need in the art for a system, apparatus and method that monitors and tracks items stored in a controlled space, which is conveniently portable throughout an industrial plant or outdoor location.

SUMMARY

In a first embodiment of the present disclosure, a portable asset dispensing device includes a container configured to be moved to a plurality of locations, the container including an interior and an end; a door positioned at the end of the container, the door having a locking mechanism; a security access device disposed at the end and configured to accept access information; a controller and computer for controlling access into the container and tracking a plurality of items within the interior of the container; and a radio frequency identification (RFID) reader disposed within the interior of the container, the plurality of RFID antenna configured to detect RFID tags located on the plurality of items within the interior of the container and communicate the items to the controller; wherein, the controller communicates with the computer and the computer identifies an authorized user based on information entered on the security access device and sends authorization to the controller, wherein, the controller sends a command to the locking mechanism to unlock the door and permit access into the interior of the container to the authorized user; further wherein, the computer associates one or more items from the plurality of items that the authorized user removed from or returned to the container based on the plurality of items detected by the RFID reader and antenna after the authorized user exits the interior of the container.

In a first example of this embodiment, the container may be a ten foot container, a 20 foot container, or a 40 foot container. In a second example, an HVAC system is operable to control an environment in the interior of the container. In a third example, the device includes an emergency switch having an alarm, the emergency switch configured to sound the alarm and permit emergency access into the interior of the container by causing the locking mechanism to unlock the door when the emergency switch is triggered. In a fourth example, a door sensor is in electronic communication with the controller, the door sensor configured to communicate to the controller whether the door is open or closed.

In a fifth example, the controller commands an alarm to sound when the door sensor reports that the door has been open for a predetermined amount of time. In a sixth example, a human machine interface (HMI) is adaptable to provide instructions and communicate information to the user. In a seventh example, a presence detection device is in electronic communication with the controller and computer, wherein the presence detection device communicates to the controller and server when the user is present within the portable asset dispensing device.

In a further embodiment of this disclosure, a method of tracking inventory in a mobile container at a job site includes providing the mobile container having an interior and an end, an access point disposed in the end, a controller, a computer, a plurality of RFID readers and antenna disposed within the interior of the container, a security access device, and a plurality of items disposed within the interior each having a RFID tag; performing a first RFID scan of the plurality of items disposed within the interior of the container; receiving access information at the security access device from an authorized user; allowing access to the interior of the container via the access point to the authorized user; detecting when the authorized user exits the interior of the container through the access point; performing a second RFID scan of the plurality of items disposed within the interior of the container; comparing the first RFID scan to the second RFID scan; determining which of the plurality of items the authorized user returned to or retrieved from the container based on the scanned items; and associating one or more of the plurality of items returned to or retrieved from the container to the authorized user.

In one example of this embodiment, the method includes sensing the presence of the authorized user in the container. In a second example, the method includes enabling a locking mechanism to prohibit access to the interior of the container after the sensing step. In a third example, the sensing step is performed by a video camera. In a fourth example, the method includes providing a door sensor; and sensing when the door is open and when it is closed. In a fifth example, the method includes sounding an alarm until the door is closed when the door is held open for a predetermined period of time.

In another example of this embodiment, the method includes providing a user interface; and displaying the transaction list of items to the authorized user on the user interface. In a further example, the method includes allowing the authorized user to request a third RFID scan if the authorized user disagrees with the transaction list; performing the third RFID scan of the plurality of items disposed within the interior of the container; comparing the first RFID scan with the third RFID scan; determining which of the plurality of items the authorized user returned to or retrieved from the container based on the comparing step; and associating one or more of the plurality of items returned to or retrieved from the container to the authorized user.

In another embodiment of the present disclosure, a system of monitoring inventory at a job site includes a mobile container having at least one door with a locking mechanism; a controller; a computer; a security access device disposed adjacent to the at least one door and configured to accept access information; a plurality of items each having its own RFID tag disposed within the container; and a plurality of RFID readers and antenna disposed within the container; wherein, the controller sends commands to unlock the door when an authorized user provides proper access information at the security access device; further wherein, the controller commands the plurality of RFID readers and antenna to perform a first RFID read before the authorized user enters the container to create a first list of items from the plurality of items and after the authorized user leaves the container to create a second list of items; further wherein, the controller compares the first list of items to the second list of items to determine which of the plurality of items the authorized user returned or retrieved; further wherein, the controller associates the items returned and retrieved with the authorized user.

In one example of this embodiment, the system includes a remote inventory system, wherein the controller sends a list of items associated with the authorized user to the inventory system. In a second example, the method includes an emergency switch, wherein when the authorized user activates the emergency switch, the controller sends a command to the locking mechanism on the door to unlock the door and allow emergency access into the container.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The above-mentioned aspects of the present application and the manner of obtaining them will become more apparent and the teachings of the present application itself will be better understood by reference to the following description of the embodiments of the present application taken in conjunction with the accompanying drawings.

Figure 1:
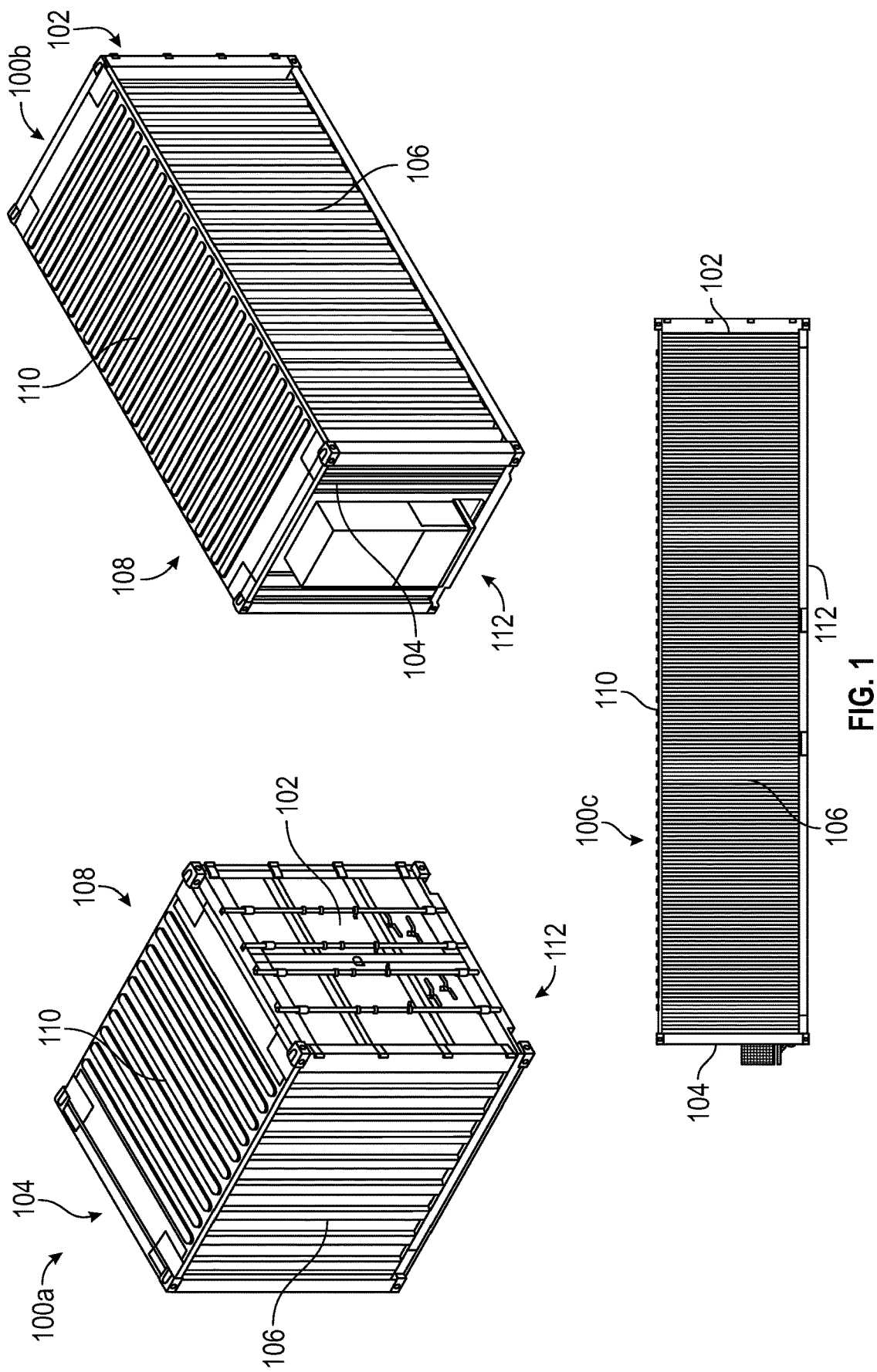
FIG. 1 is a perspective view of a ten-foot unit on the left and a twenty-foot unit on the right with a side view of a forty-foot unit in the lower middle.

In FIG. 1, a 10-foot container 100a, a 20-foot container 100b, and a 40-foot container 100c are shown. Each container 100a, 100b, 100c includes a first end 102 and a second end 104. The second end 104 is disposed opposite the first end 102. The first end 102 may include an entrance (not shown) to the interior of the container 100a, 100b, 100c. The container 100a, 100b, 100c may further include a first side 106, a second side 108, a top 110, and a bottom 112. The different ends and sides define the interior of the container 100a, 100b, 100c. The outer surface of each end or side may be formed of any material including steel, aluminum, or any other material. For example, the outer surface of each end may be formed of a non-metallic material. The interior walls, however, of the container 100a, 100b, 100c can be formed of a metallic material. Any metallic material may be used, but one that better deflects radio frequency identification (RFID) signals within the container 100a, 100b, 100c provides certain advantages in this disclosure.

Figure 2:
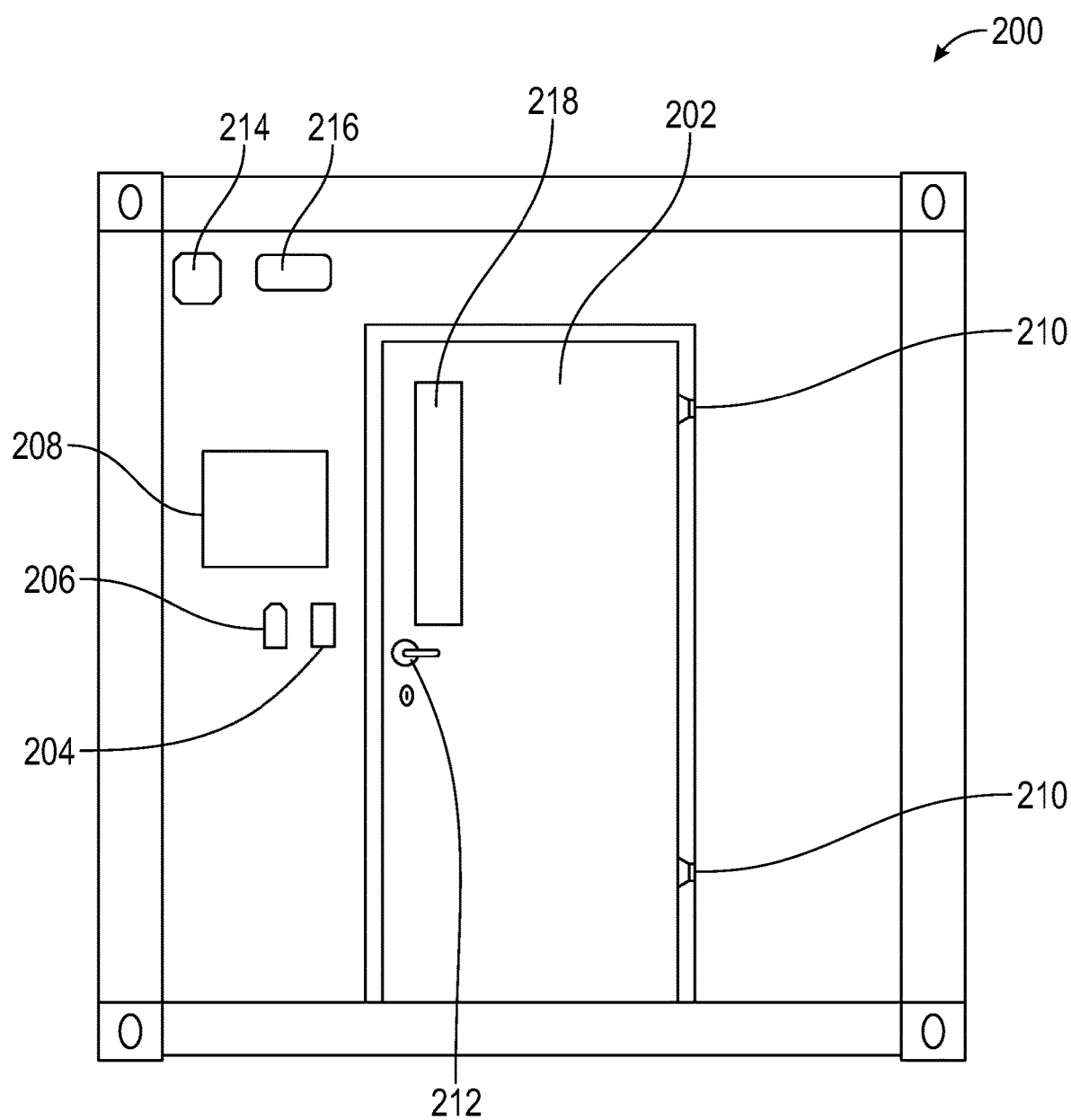
FIG. 2 is a front view of a container demonstrating the entrance to the container.

In FIG. 2, an entrance 200 on the first end 102 of a container 100a, 100b, 100c is shown. The entrance 200 includes a framed door 202 positioned to allow entrance into and out of the unit. The door 202 includes a door open/close sensor 210 mounted in the door 202 and door frame. There may be a plurality of door open/close sensors 210 and the door open/close sensor 210 may be magnetic door contacts, infrared sensors, or any other sensors known in the art. The door open/close sensor 210 can monitor when the door 202 is opened, closed, and latched and may be in communication with a programmable logic controller (PLC) (not shown; described in more detail below) to relay information about the status of the door 202. For instance, if the door 202 is opened for an extended period of time, the door open/close sensor 210 may send a signal to the PLC, and the PLC may sound an alarm. The door 202 further includes a door lock/unlock mechanism 212 that is configured to electronically lock and unlock the door 202 based on commands from the PLC. The door lock/unlock mechanism 212 may be a rotatable handle (shown in FIG. 2), a push bar, a knob, or any other door opening mechanism known in the art. A window 218 may be formed in the entrance door 202 as well.

As demonstrated by FIG. 2, the entrance 200 further includes a security access device 204 located adjacent to the door 202. The security access device 204 may provide security to the entrance 200 by requiring a user to gain clearance before entering. The security access device 204 may be a keyboard, number pad, radio frequency identification (RFID) card reader, a smartcard reader, biometrics scanner, or any other security recognition device known in the art. A user attempting to gain access through the door 202 must pass clearance by the security access device 204 in order for the door 202 to unlock. For example, if the security access device 204 is a keypad, the user may be required to enter a certain access code before entering the unit. In another non-limiting example, if the security access device 204 is a RFID card reader, the user may be required to swipe or display a valid RFID card. In another embodiment, biometrics or the like may be used for gaining access to the interior of the container 100a, 100b, 100c. For instance, a finger print or other unique biomarker may be used to gain access.

The entrance 200 may further include an emergency switch 206 located adjacent to the door 202. The emergency switch 206 is configured to disable the electronic lock mechanism of the door lock/unlock mechanism 212 such that in the event of an emergency, the container 100a, 100b, 100c may become accessible without clearance. The emergency switch 206 may be any emergency unlock system known in the art including, but not limited to, a switch, a glass plate, or a pull down bar. The emergency switch 206 can be configured to send a signal to the PLC so that the PLC can sound an alarm alerting the jobsite to an emergency situation within the container 100a, 100b, 100c. The emergency switch 206 might be, for example, a glass plate which when broken, can sound an alarm and unlock the door 202.

The entrance 200 may further include a human machine interface (HMI) 208 positioned adjacent to the door 202. The HMI 208 may be a touch screen, computer screen, or any other communication interface known in the art. The HMI 208 is configured to confirm transactions, communicate with the user, and direct the user about procedures. For example, the HMI 208 may direct a user to input an access code on the security access device 204 in order to access the unit, display the return policy, and complete and confirm the transaction once the user has exited the unit. Other touch screen functions are contemplated and the HMI 208 of the present disclosure is not limited to the above list of communication functions.

The entrance 200 further includes an antenna 214 that is connected to a Wi-Fi router that may be cellular. The antenna 214 may be situated anywhere in the entrance 200 and the Wi-Fi router may be situated anywhere in the unit in general and is configured to provide a means of remotely viewing the cameras, remotely accessing the computer and the PLC for software updates, and updating the cloud. It can also provide a means of remotely accessing the PLC to possibly control the door functions. For example, a new employee of the company working on the jobsite might not yet have proper credentials in order to gain access into the container 100a, 100b, 100c. By having someone with authority communicate commands via the Wi-Fi router 214 to the PLC to unlock the door 202, the new employee would be able to access the unit without first gaining clearance on the security access device 204. Alternatively, the Wi-Fi may be used for accessing software updates and updating the cloud. This essentially achieves data transfer to the cloud and allows for remote maintenance and support of the software.

The entrance 200 may further include a light source 216 configured to provide illumination to the entrance 200 so a user can see during hours of darkness. The light source 216 can be positioned such that its light shines on the abovementioned features that a user must interact with in order to enter the container. The light source 216 may be any light bulb or LED known in the art or any other light source known in the art.

Figure 3:
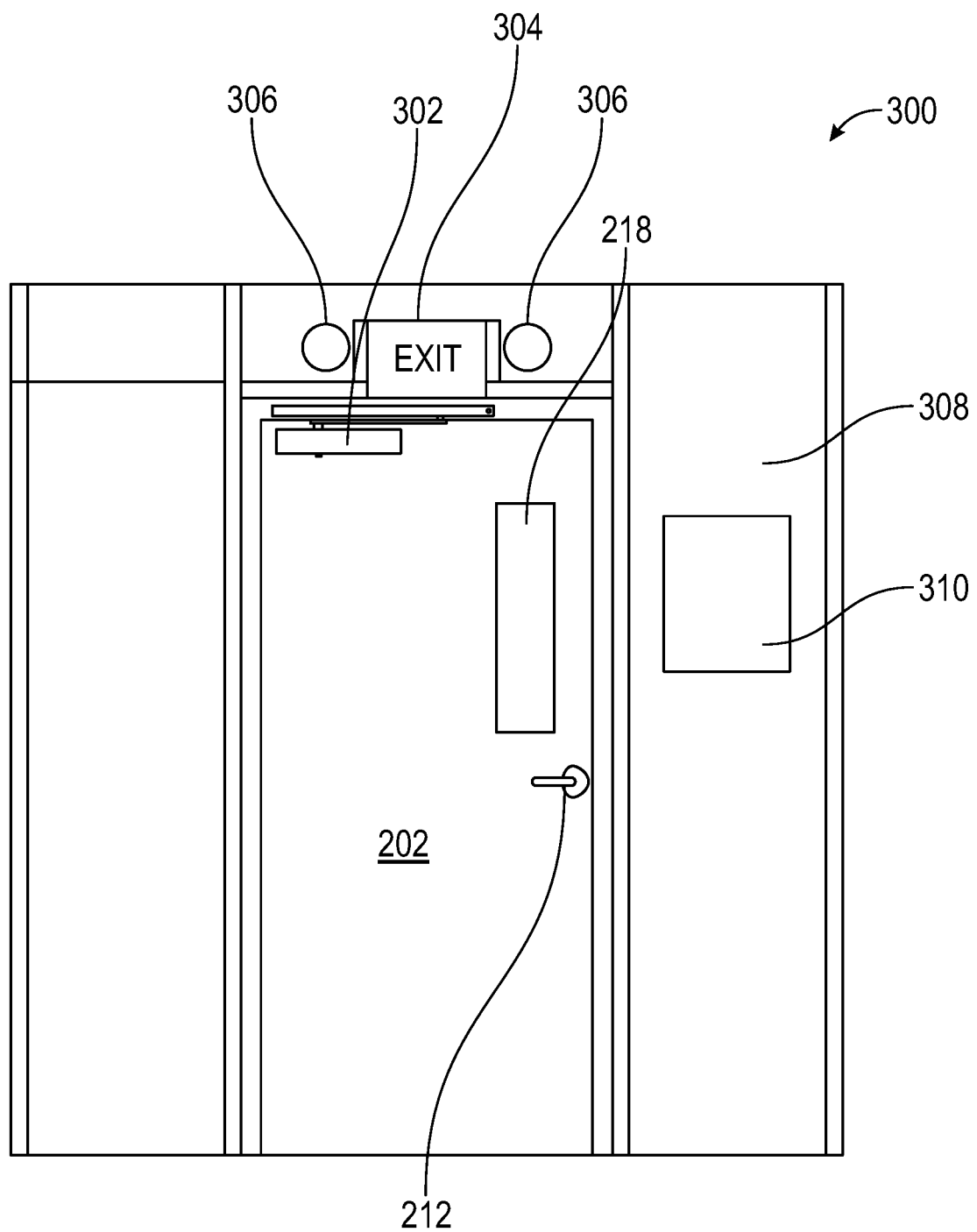
FIG. 3 is a view of the exit of a container from inside the container.

FIG. 3 is an interior view of the entrance 200, which, from this perspective, would more properly be referred to as an exit 300. The exit 300 includes the same framed door 202 as previously described. As demonstrated by FIG. 3, the door further includes a self-closing mechanism 302 configured to automatically close the door 202 once a user has entered or exited the container 100a, 100b, 100c in order to limit access and maintain security. The abovementioned features of the window 218 and the door lock/unlock mechanism 212 are also demonstrated in FIG. 3. An exit sign 304 and lights 306 are also included in the exit 300, which may be designed to keep the container safety compliant with federal or state regulations.

As illustrated in FIG. 3, a computer cabinet 308 can be adjacent to the door 202. The computer cabinet 308 may house a computer, the PLC, a backup battery, a RFID reader and all other components needed to operate the systems. The computer cabinet 308 may include an access panel 310 into the computer cabinet 308. The access panel 310 is configured to permit access for maintenance and to service the HMI 208.

Figure 4:
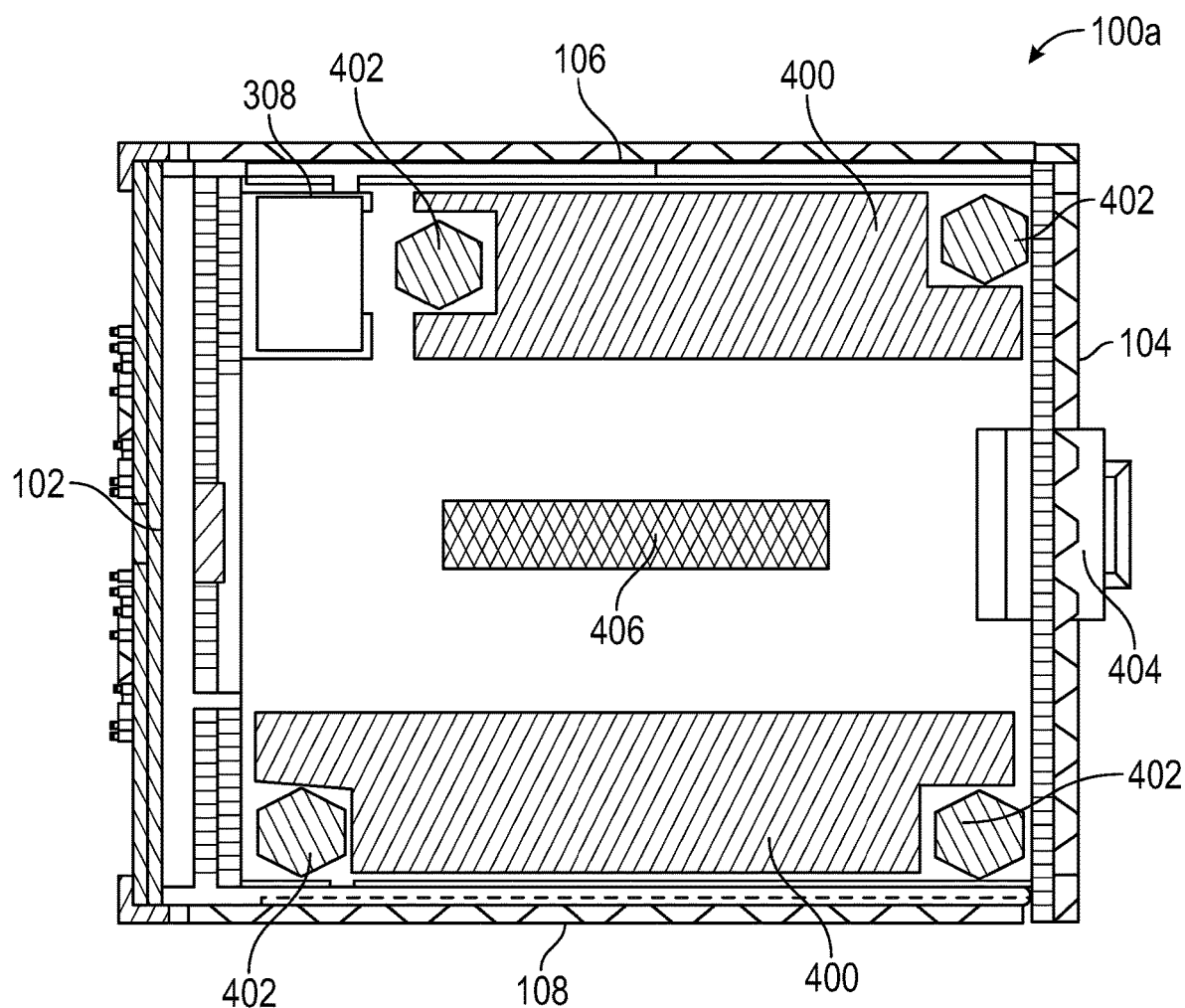
FIG. 4 is an overhead view of a ten-foot unit demonstrating a possible configuration and various internal components of the container.

In FIG. 4, a 10-foot container 100a is shown from an overhead view to exhibit the layout. The container 100a may be equipped with a plurality of shelves 400 for holding or displaying objects or items. The plurality of shelves 400 may be positioned against the interior of the first and second sides 106, 108 of the container 100a as demonstrated in FIG. 4. The plurality of shelves 400 or other storage means may be formed or made of a non-metallic material such as plastic. Other materials may be used as well.

In an alternative embodiment of FIG. 4, the 10-foot container 100a may be equipped with a second, unsecured door (not shown) for entry into a connected warehouse which can be but is not limited to 40-foot containers.

A plurality of RFID antenna 402 connected to a RFID reader may be positioned within the interior of the container 100a at various locations. There may be RFID antenna 402 located at each corner of the container and one or more at locations therebetween. Each RFID antenna 402 is positioned to detect the presence of RFID tags located on items or objects in the container 100a. For instance, an item or object may be placed on a shelf 400 and a unique RFID tag or code is disposed on the item or object. One or more RFID antenna 402 can detect the presence of the item or object inside the container 100a by scanning and detecting the RFID tag. The RFID reader sends all tags read to the PLC. The PLC sends the list of tags read to the computer running the Inventory Tracking and Access Control System so if an item or object is retrieved or replaced by a user, the Inventory Tracking and Access Control System may detect the absence or presence of said item or object. Another example would be when a person enters the container with an item or object disposed of a unique RFID tag, one or more RFID antenna 402 can detect the presence of the item or object. The RFID antenna 402 can be coupled to swivel mounts attached to poles so that the RFID antenna 402 can be positioned as needed to get the best reads from the RFID tags on the items or objects.

In certain embodiments, the container 100a may also include a HVAC unit 404 for maintaining a proper temperature within the container 100a. Specifically, the HVAC unit 404 is used to keep the hardware and electrical components within the computer cabinet 308 from overheating or freezing. Depending on the climate in which the jobsite is situated, the HVAC unit 404 may not be necessary.

In one embodiment, the container 100a may also include a pressure-sensitive mat 406 on the floor for detecting the presence of a user within the container 100a. The pressure-sensitive mat 406 may be configured to communicate the presence (or absence) of a human to the PLC. In an alternative embodiment the pressure-sensitive mat 406 could be replaced by a camera, a series of light beams, or any other human detection device known in the art. Additionally, a camera may be installed providing the ability to view the transactions remotely either by a live stream or from a recording.

In an alternative embodiment, the container 100a of FIG. 4 may be arranged differently from that shown. For example, the aforementioned unsecured door may be located in place of the HVAC unit 404 along the second end 104. In this embodiment, there may be no shelves 400 and the HVAC unit 404 may be relocated to a different side wall (e.g., 108). Another door may be provided in the container 100a along the first end 102 which may lead or be connected to a warehouse or other storage facility.

Figure 5:
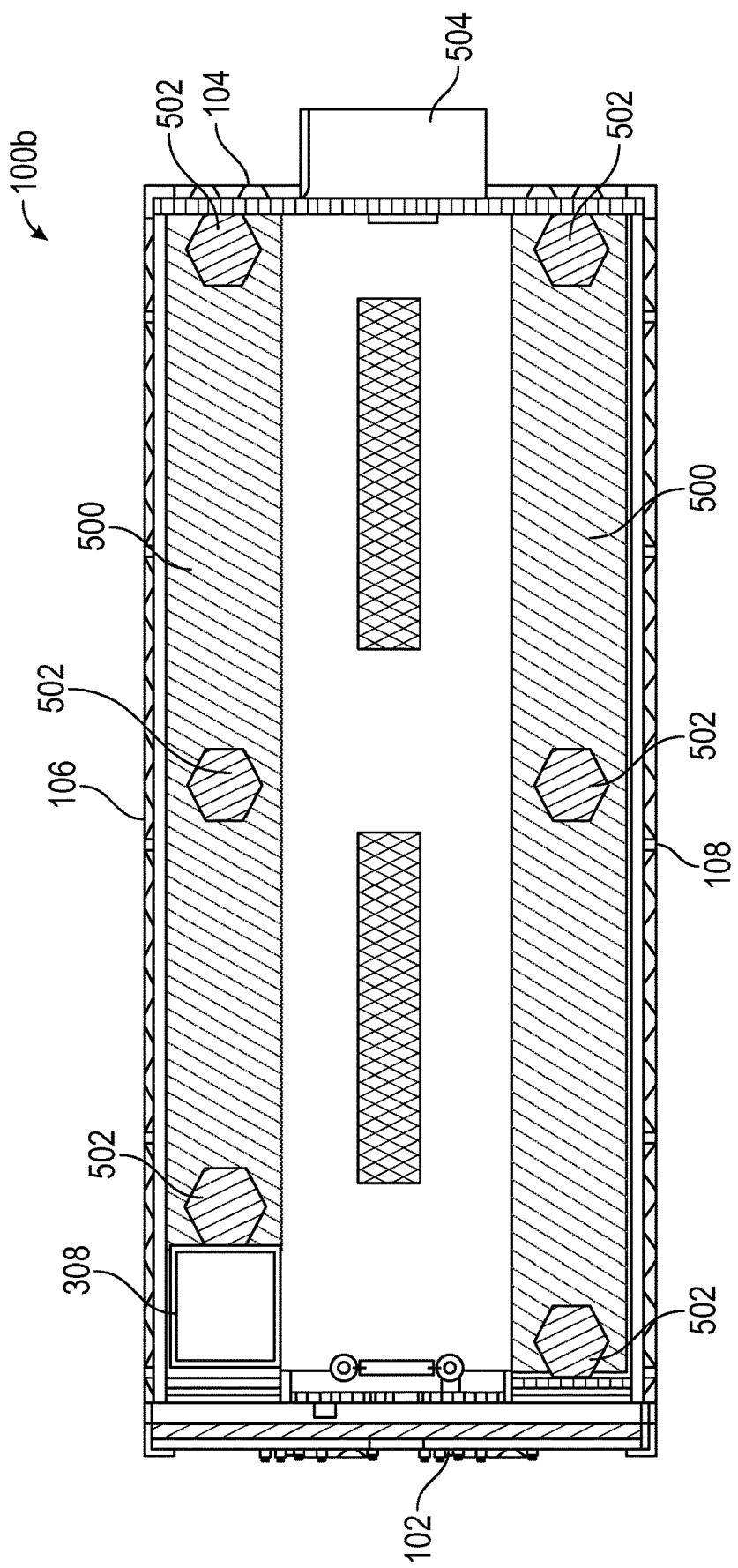
FIG. 5 is an overhead view of a twenty-foot unit demonstrating a possible configuration and various internal components of the container.

In FIG. 5, a 20-foot container 100b is shown from an overhead view to exhibit the layout. The container 100b may be equipped with a plurality of shelves 500 for holding or displaying objects or items. The plurality of shelves 500 may be positioned against the interior of the first and second sides 106, 108 of the container 100b as demonstrated in FIG. 5, and the plurality of shelves 500 may be longer and provide more storage space than the plurality of shelves 400 in the 10-foot container 100a. The plurality of shelves 500 or other storage means may be formed or made of a non-metallic material such as plastic. Other materials may be used as well.

A plurality of RFID antenna 502 attached to an RFID reader may be positioned within the interior of the container 100b at various locations. There may be RFID antenna 502 located at each corner of the container and one or more at locations there between. Each RFID antenna 502 is positioned to detect the presence of RFID tags located on items or objects in the container 100b. For instance, an item or object may be placed on a shelf 500 and a unique RFID tag or code is disposed on the item or object. One or more RFID antenna 502 can detect the presence of the item or object inside the container 100b by scanning and detecting the RFID tag. The RFID reader sends all tags read to the PLC. The PLC sends the list of tags read to the computer running the Inventory Tracking and Access Control System so if an item or object is retrieved or replaced by a user, the Inventory Tracking and Access Control System may detect the absence or presence of said item or object. The RFID antenna 502 can be coupled to swivel mounts attached to poles so that the RFID antenna 502 can be positioned as needed to get the best reads from the RFID tags on the items or objects.

In certain embodiments, the container 100b may also include a HVAC unit 504 for maintaining a proper temperature within the container 100b. Specifically, the HVAC unit 504 is used to keep the hardware and electrical components within the computer cabinet 308 from overheating or freezing. The HVAC unit 504 may have a higher capacity than the HVAC unit 404 of the 10-foot container 100a in order to heat or cool the additional space in the 20-foot container 100b. Depending on the climate in which the jobsite is situated, the HVAC unit 504 may not be necessary.

In one embodiment, the container 100b may also include a plurality of pressure-sensitive mats 506 on the floor for detecting the presence of a user within the container 100b. The plurality of pressure-sensitive mats 506 may be configured to communicate the presence (or absence) of a human to the PLC. In an alternative embodiment the plurality of pressure-sensitive mats 506 could be replaced by a camera, a series of light beams, or any other human detection device known in the art. Additionally, a camera may be installed providing the ability to view the transactions remotely either by a live stream or from a recording.

Figure 6:
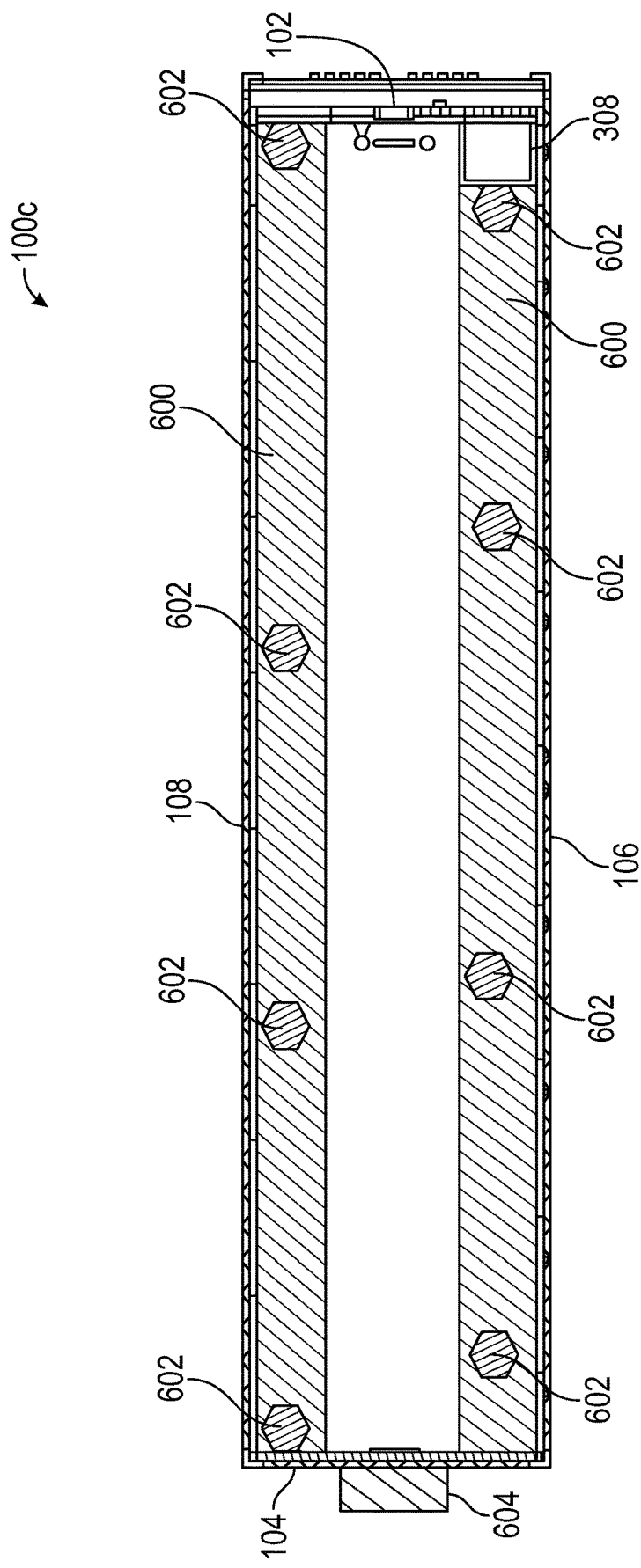
FIG. 6 is an overhead view of a forty-foot unit demonstrating a possible configuration and various internal components of the container.

In FIG. 6, a 40-foot container 100c is shown from an overhead view to exhibit the layout. The container 100c may be equipped with a plurality of shelves 600 for holding or displaying objects or items. The plurality of shelves 600 may be positioned against the interior of the first and second sides 106, 108 of the container 100c as demonstrated in FIG. 6. The plurality of shelves 600 may be longer than the plurality of shelves 400 in the 10-foot container 100a and the plurality of shelves 500 in the 20-foot container 100b in order to provide more storage space. The plurality of shelves 600 or other storage means may be formed or made of a non-metallic material such as plastic. Other materials may be used as well.

A plurality of RFID antenna 602 attached to a RFID reader may be positioned within the interior of the container 100c at various locations. There may be RFID antenna 602 located at each corner of the container and one or more at locations there between. Each RFID antenna 602 is positioned to detect the presence of RFID tags located on items or objects in the container 100c. For instance, an item or object may be placed on a shelf 600 and a unique RFID tag or code is disposed on the item or object. One or more RFID antenna 602 can detect the presence of the item or object inside the container 100c by scanning and detecting the RFID tag. The RFID reader sends all tags read to the PLC. The PLC sends the list of tags read to the computer running the Inventory Tracking and Access Control System so if an item or object is retrieved or replaced by a user, the Inventory Tracking and Access Control System may detect the absence or presence of said item or object. The RFID antenna 602 can be coupled to swivel mounts attached to poles so that the RFID antenna 602 can be positioned as needed to get the best reads from the RFID tags on the tools or objects.

In certain embodiments, the container 100c may also include a HVAC unit 604 for maintaining a proper temperature within the container 100c. Specifically, the HVAC unit 604 is used to keep the hardware and electrical components within the computer cabinet 308 from overheating or freezing. The HVAC unit 604 may have a higher capacity than the HVAC unit 404 of the 10-foot container 100a and the HCAC unit 504 of the 20-foot container 100b in order to heat or cool the additional space in the 40-foot container 100c.

Depending on the climate in which the jobsite is situated, the HVAC unit 604 may not be necessary.

In one embodiment, the container 100*c* may also include a plurality of pressure-sensitive mats (not shown) on the floor for detecting the presence of a user within the container 100*c*. The plurality of pressure-sensitive mats may be configured to communicate the presence (or absence) of a human to the PLC. In an alternative embodiment, the plurality of pressure-sensitive mats could be replaced by a camera, a series of light beams, or any other human detection device known in the art. Additionally, a camera may be installed providing the ability to view the transactions remotely either by a live feed or from a recording.

In another embodiment of the present disclosure illustrated in FIGS. 7-14, a container 100*a*, 100*b*, 100*c* may be converted into a mobile security system (MOSS) to monitor user entrance and exit, maintain security, and complete and track transactions for a storage facility like a warehouse for example. For instance, a MOSS may permit secure entry into and exit from a warehouse where jobsite items are stored while tracking transactions using the components listed hereinabove. A MOSS may include a MOSS door for entry into and exit out of the MOSS and a warehouse door for entry into the warehouse from the MOSS 700. A MOSS may have at least two modes, a single shopper mode (FIGS. 8-10) and a multi-shopper mode (FIGS. 11-14). The processes for operating the MOSS in these two modes will become more apparent in the below descriptions. Despite the unbroken nature of the processes, the figures themselves break up the processes because the steps cannot all fit on the same figure. Because the steps in the processes span several figures, the reference numerals (RN) describing these steps match the figure number on which they appear (i.e. the single shopper mode process has RN 800-828 on FIG. 8, RN 902-930 on FIG. 9, and RN 1002-1024 on FIG. 10).

Figure 7:
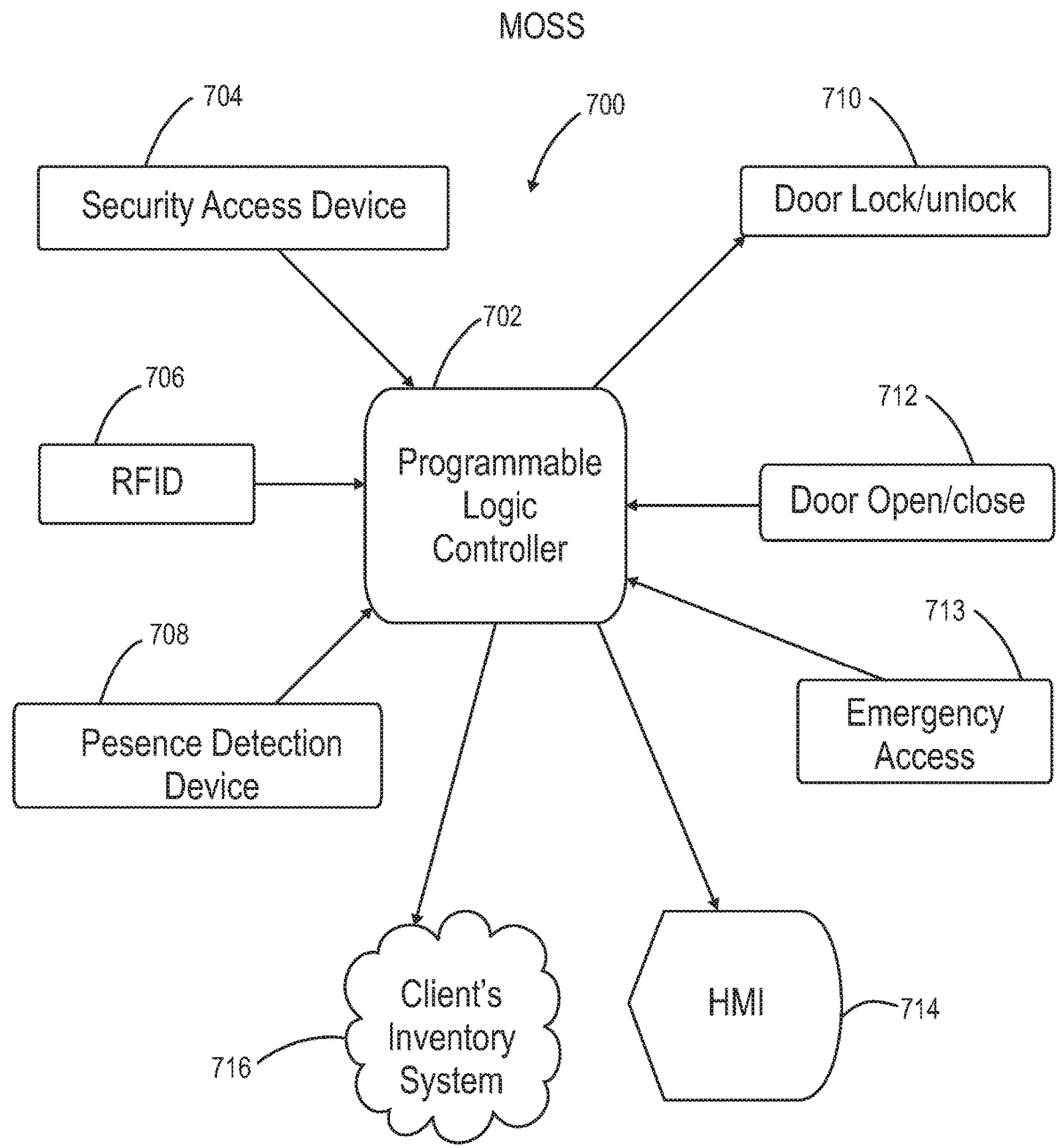
FIG. 7 is a schematic layout of the components of a mobile security system showing how they communicate.

Referring to FIG. 7, an exemplary component communication layout for a MOSS 700 is shown. The MOSS 700 includes a PLC 702 which is capable of communicating with a security access device 704, a plurality of RFID readers 706, a presence detection device 708, a door lock/unlock mechanism 710, a door open/close sensor 712, and a computer running an Inventory Management and Access Control System 716 which communicates with a human machine interface (HMI) 714. For emergency entry into the storage facility, an emergency switch (not shown) may be attached to the outside of the MOSS 700. If the user activates the emergency switch, then the emergency switch can send a signal to the PLC 702, and the PLC 702 can send an unlock command to the door lock/unlock mechanism 710 and sound an alarm. The exact processes of the MOSS 700 will be described in further detail below. It will become apparent to one skilled in the art how these component parts work together to create the invention of the present disclosure.

Figure 8:
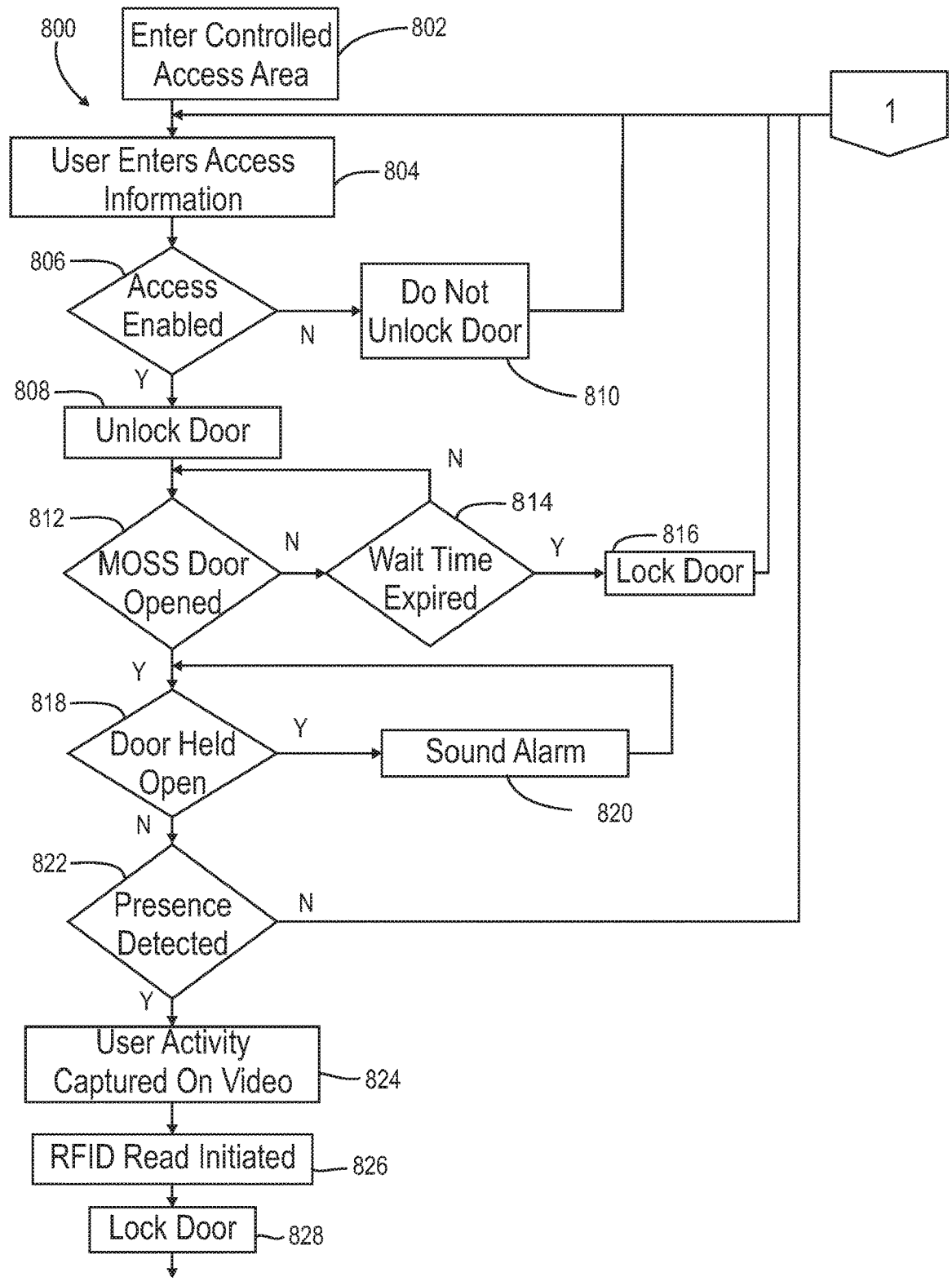
FIG. 8 is a schematic flowchart showing a first portion of the mobile security system's single shopper mode process.
Figure 9:
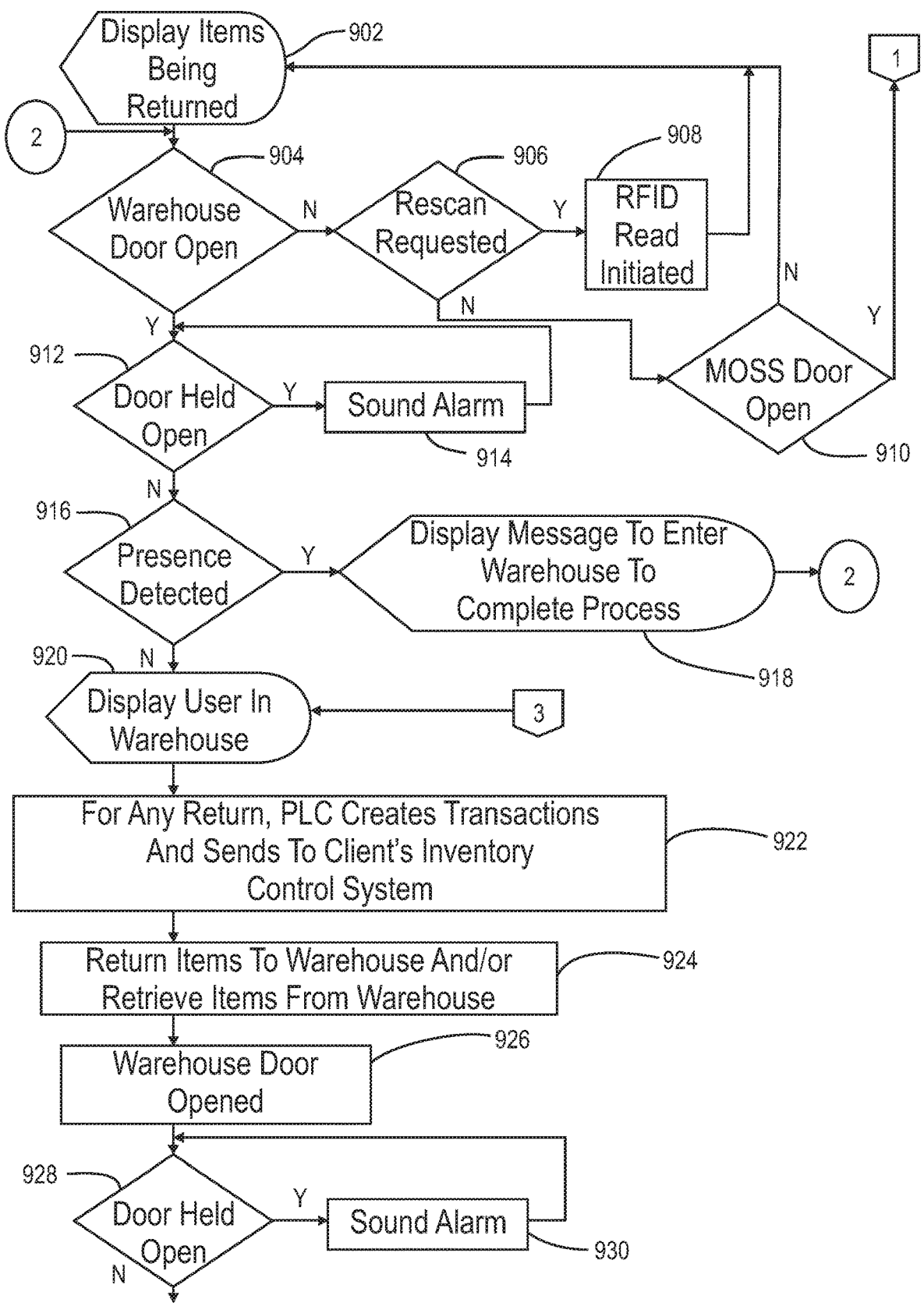
FIG. 9 is a schematic flowchart showing a second portion of the mobile security system's single shopper mode process.
Figure 10:
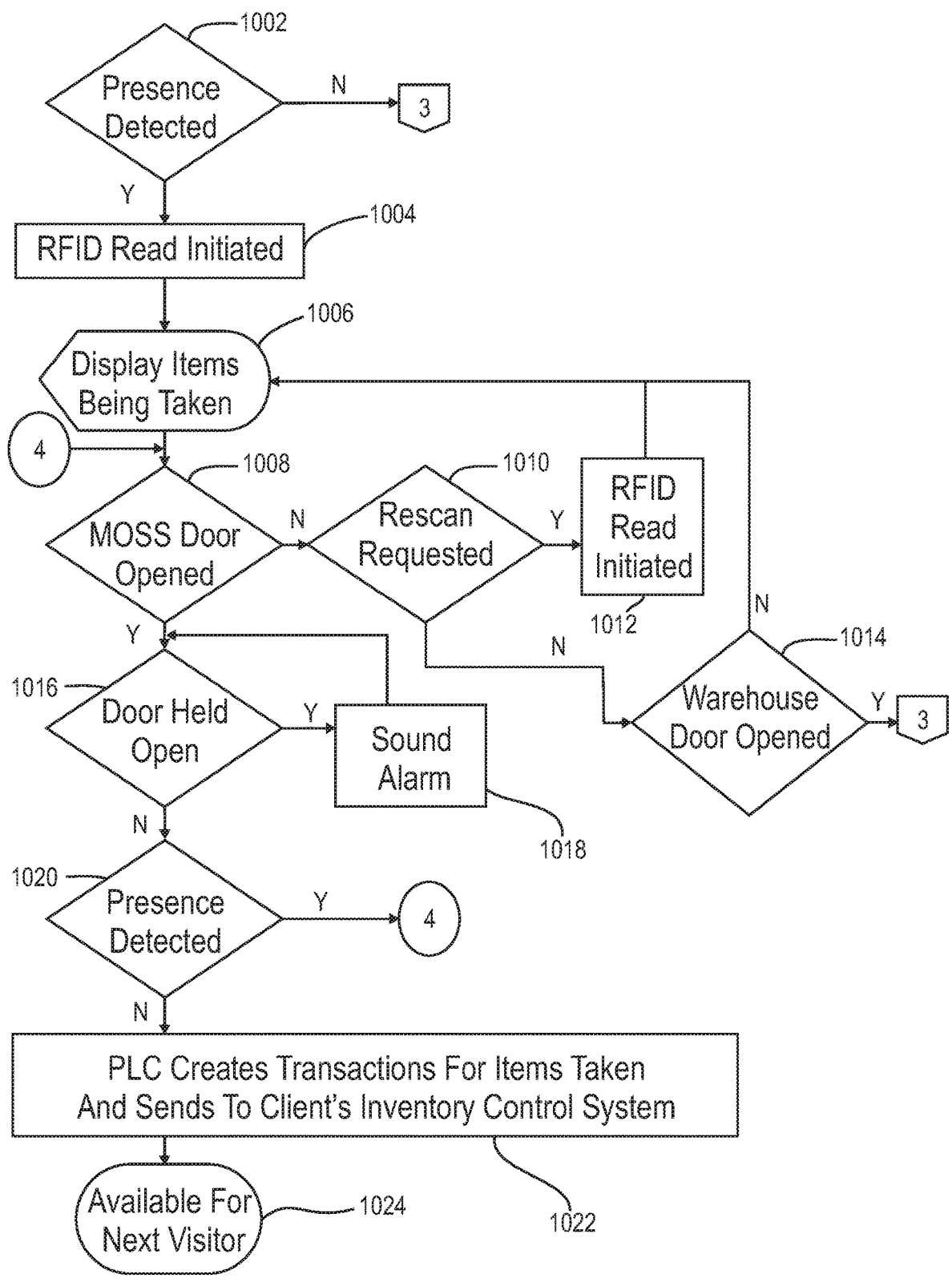
FIG. 10 is a schematic flowchart showing a third portion of the mobile security system's single shopper mode process.

Referring to FIGS. 8-10, a process 800 for operating the MOSS 700 in a single shopper mode is demonstrated. First, a user may enter the controlled access area (at block 802) and scan/enter access information using the security access device 704 (at block 804). The security access device 704 may send a signal to the PLC 702, and PLC 702 may communicate with the Inventory Management and Access Control System 716 to determine whether the input information is valid for entry. If the access information is invalid, then access may be denied (at block 806), and the Inventory Management and Access Control System 716 may communicate access denied with the PLC 702 which may send a command to the door lock/unlock mechanism 710 to keep the door locked (at block 810). The process 800 may return to block 804 and the Inventory Management and Access Control System 716 may send a command to the HMI 714 to display a message to rescan/reenter access information using the security access device 704. If the access information is valid, then access can be granted (at block 806) and the PLC 702 can send a command to the door lock/unlock mechanism 710 to unlock the MOSS door (at block 808).

Once the MOSS door is unlocked (at block 808), the door open/close sensors 712 may signal to the PLC 702 whether the MOSS door is opened or remains closed (at block 812). If the MOSS door remains closed (at block 812) for a specified wait time (at block 814), then the PLC 702 can send a command to the door lock/unlock mechanism 710 to lock the MOSS door (at block 816). The process 800 may return to block 804 and the Inventory Management and Access Control System 716 may send a command to the HMI 714 to display a message to rescan/reenter access information using the security access device 704. If the MOSS door is opened (at block 812) and the MOSS door is held open (at block 818), the door open/close sensor 712 may send a signal to the PLC 702, and the PLC 702 can sound an alarm (at block 820) until the PLC 702 receives confirmation from the door open/close sensors 712 that the MOSS door is closed. The presence detection device 708 may be positioned inside the MOSS 700 to detect the user's presence (at block 822).

Entry may be determined by the MOSS door opening (at block 812), closing (at block 818), and the presence detection device 708 sensing the user's presence (at block 822). If the user's presence is not detected (at block 822), then the process 800 can return to block 804 and the Inventory Management and Access Control System 716 may send a command to the HMI 714 to display a message to rescan/reenter access information using the security access device 704. The presence detection device 708 may be a camera with video analytics, floor mat sensors, a light beam, smartcard scanner or any other detection device known in the art. The user's activity may be captured on video (at block 824) using a live feed and a recording captured by the presence detection device 708.

The PLC 702 can send a signal to the door lock/unlock mechanism 710 to lock the MOSS door (at block 828) once the user's entry has been determined. The PLC 702 can then send a read request to the plurality of RFID readers 706 to initiate an RFID read (at block 826). The plurality of RFID readers and antenna 706 can perform the RFID read and send a list of all the tagged items within the MOSS 700 to the PLC 702 and the PLC 702 can send the list of items to the Inventory Management and Access Control System 716.

Referring to FIG. 9, the single shopper mode process 800 may continue with the Inventory Management and Access Control System 716 sending a command to display the list of items being returned (if any) on the HMI 714 (at block 902). If the user disagrees with the list, the user may press a RESCAN button (at block 906) on the HMI 714 touch screen. In the case of a rescan request (at block 906), the HMI 714 can send a signal to the Inventory Management and Access Control System 716, and the PLC 702 may send a command to initiate an RFID read to the plurality of RFID readers 706 (at block 908). The plurality of RFID readers and antenna 706 can perform the rescan and return the results to the PLC 702. The PLC 702 can send the list of items to the Inventory Management and Access Control System 716. The Inventory Management and Access Control System 716 may send a command to display all items being returned (if any) to the HMI 714 display (at block 902). If the user agrees with the list of items, then the user may enter the warehouse through the warehouse door (at block 904).

The door open/close sensors 712 of the warehouse door can communicate with the PLC 702 about whether the warehouse door is opened or closed (at block 904). If the user does not open the warehouse door (at block 904) and does not request a rescan (at block 906), then the PLC 702 may send an unlock command to the door lock/unlock mechanism 710 on the MOSS door (at block 910). If the user exits through the MOSS door (at block 910), the process 800 can return to block 804 to once again ask a user to scan/enter access information. If the user does not open the MOSS door, then the process 800 can return to block 902 and the HMI 714 can continue to display the list of tagged items within the MOSS 700.

If the warehouse door is opened (at block 904) and held open (at block 912) for a predetermined period of time, then the door open/close sensor 712 can send a signal to the PLC 702, and the PLC 702 can sound an alarm (at block 914). When the door is closed, if a presence is detected by the presence detection device 708 within the MOSS 700 (at block 916), then the presence detection device 708 can send a signal to the PLC 702 indicating that the user is present in the MOSS 700 and the PLC 702 can send a signal to the Inventory Management and Access Control System 716 that someone is in the MOSS 700. The Inventory Management and Access Control System 716 can send a command to the HMI 714 to display a message for the user to enter the warehouse (at block 918). Entry into the warehouse is complete once the warehouse door is opened (at block 904) and closed (at block 912) and the presence detection device 708 does not detect the user (at block 916).

When entry is complete, the Inventory Management and Access Control System 716 can command the HMI 714 to display a message that the user is in the warehouse (at block 920). The Inventory Management and Access Control System 716 creates transactions for all items returned and updates inventory (at block 922). The user may return items to the warehouse and/or retrieve items from the warehouse for a new transaction (at block 924). Once the user is ready to exit the warehouse, the user can return to the MOSS 700 and open the unlocked warehouse door (at block 926). If the warehouse door is held open (at block 928), then the door open/close sensor 712 may send a signal to the PLC 702, and the PLC 702 can sound an alarm (at block 930).

Referring to FIG. 10, the single shopper mode process 800 of the MOSS 700 can continue with the presence detection device 708 communicating with the PLC 702 about whether the user has entered the MOSS 700 or not (at block 1002). Once the warehouse door has opened (at block 926) and closed (at block 928), the presence detection device 708 may detect the presence of the user (at block 1002). If the presence detection device 708 does not detect the user, then the process 800 returns to block 920, and the HMI 714 displays that the user is in the warehouse. If the presence detection device 708 detects the user's presence within the MOSS 700 (at block 1002), then the PLC 702 may command the plurality of RFID readers 706 to initiate a read (at block 1004). The plurality of RFID readers and antenna 706 may perform the read and return the results to the PLC 702. The PLC 702 sends the list of items to the Inventory Management and Access Control System 716. The Inventory Management and Access Control System 716 can send a command to the HMI 714 to display the items being taken (at block 1006).

If the user disagrees with the list of items displayed on the HMI 714, then the user may request a rescan (at block 1010) by pressing the RESCAN button on the HMI 714. If a rescan is requested (at block 1010), then the HMI 714 can signal the Inventory Management and Access Control System 716 that a rescan has been requested, and the PLC 702 can signal to the plurality of RFID readers 706 to initiate another RFID read (at block 1012). Once the plurality of RFID readers 706 has completed the rescan, the plurality of RFID readers 706 can send a list to the PLC 702 of all the scanned items. The PLC 702 can send a list of items to the Inventory Management and Access Control System 716. The Inventory Management and Access Control System 716 can send a command to the HMI 714 to display the items being taken (at block 1006).

In the event that the user needs to reenter the warehouse to return an item or to retrieve another item and opens the warehouse door (at block 1014), the process 800 can return to block 920 and display a message indicating that the user is in the warehouse. If a rescan is not requested (at block 1010) and the user does not reenter the warehouse (at block 1014), then the process 800 can return to block 1006 and display the items being taken.

If the user agrees with the list of items displayed on the HMI 714 (at block 1006), the user may exit through the MOSS door (at block 1008). If the MOSS door is held open (at block 1016), the door open/close sensor 712 may signal to the PLC 702, and the PLC 702 can sound an alarm (at block 1018). If, however, the MOSS door closes (at block 1016) and the presence detection device 708 still detects a presence (at block 1020), then the process 800 can return to block 1008. The user's exit is confirmed when the MOSS door opens (at block 1008) and closes (at block 1016) and the presence detection device 708 does not detect a user (at block 1020). Once the exit has been confirmed, the Inventory Management and Access Control System 716 creates transactions for the items that were taken by the user and updates inventory 716 (at block 1022). The process 800 may end and the MOSS 700 and warehouse may be available for the next user (at block 1024).

Another jobsite may have a higher demand and may require a MOSS 700 having a multi-shopper mode as illustrated in FIGS. 11-14. The multi-shopper mode can allow for multiple users to be in the warehouse at the same time. In order to acquire a proper RFID read, monitor which user retrieves/returns which item(s), and maintain security, one user is granted access into the MOSS 700 at a time. For example, two or more qualified users may be shopping simultaneously, but once they desire to reenter into the MOSS 700 to check out, only one user will be allowed in the MOSS 700 at a time. Similarly, if multiple users want to access the warehouse, they may check in individually in the MOSS 700 before entering the warehouse. The MOSS 700 with multi-shopper mode is still equipped to allow/deny access and can still function to monitor and process transactions, but it allows for a user to complete transactions within the MOSS 700 while other users are returning/retrieving items within the warehouse.

Figure 11:
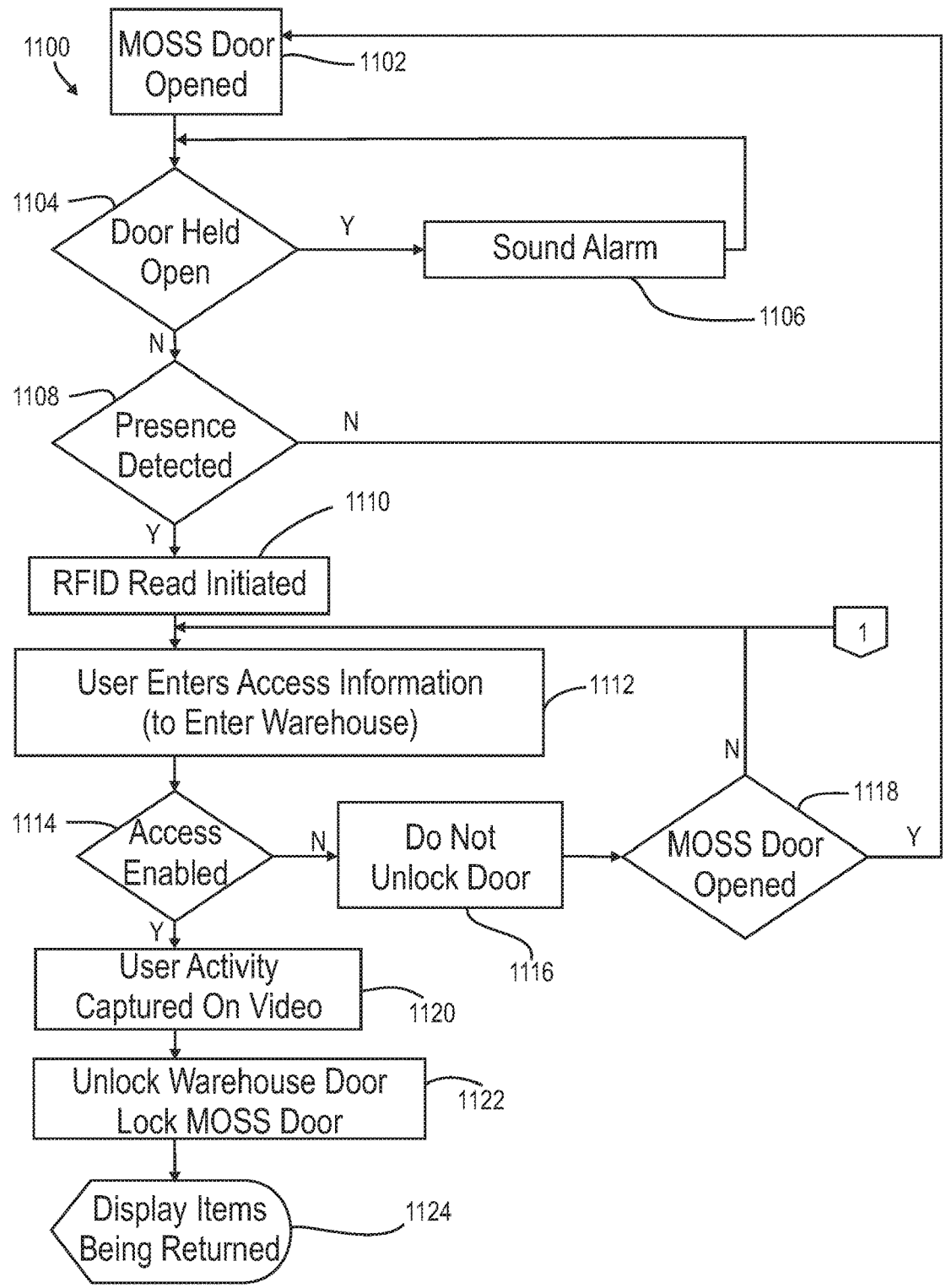
FIG. 11 is a schematic flowchart showing a first portion of the mobile security system's multi-shopper mode process for entering the warehouse.
Figure 12:
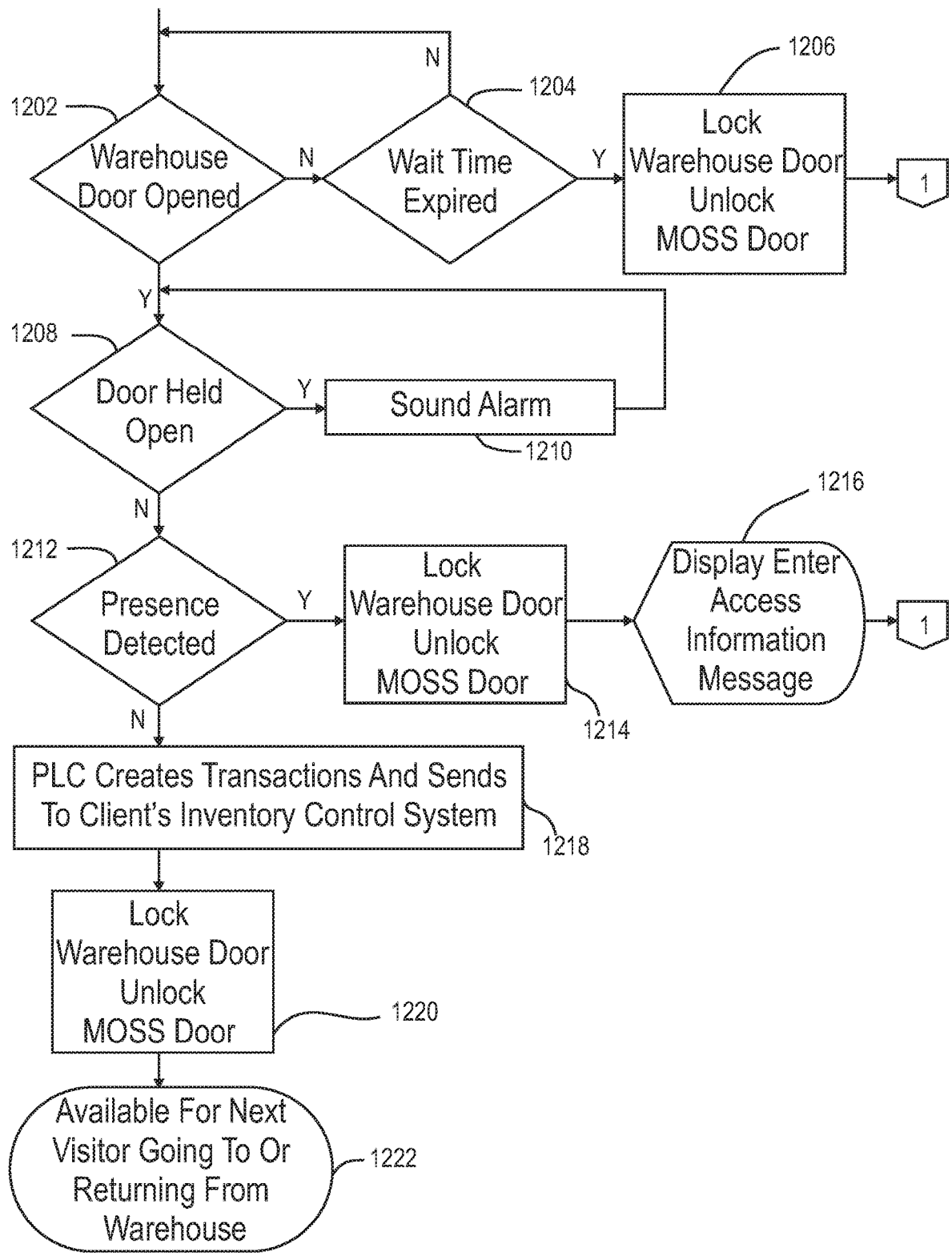
FIG. 12 is a schematic flowchart showing a second portion of the mobile security system's multi-shopper mode process for entering the warehouse.

FIGS. 11-12 illustrate an entry process 1100 for a user entering the MOSS 700 to gain access to the warehouse in a multi-shopper mode. The entry process 1100 may begin when the MOSS door is opened (at block 1102). The door open/close sensors 712 on the MOSS door can communicate with the PLC 702 about whether the MOSS door is opened (at block 1102) or closed (at block 1104). If the MOSS door is opened and not closed within a pre-determined period of time, the door open/close sensors 712 may signal to the PLC 702, and the PLC 702 can sound an alarm until the door is closed (at block 1106). The presence detection device 708 may be positioned inside the MOSS 700 to detect the user's presence (at block 1108).

Entry into the MOSS 700 is determined by the door opening (at block 1102), closing (at block 1104), and the presence detection device 708 detecting the user's presence within the MOSS 700 (at block 1108). If the presence detection device 708 does not detect the user's presence (at block 1108), then the entry process 1100 may return to block 1102. If the user's presence is detected (at block 1108), then the presence detection device 708 can send a signal to the PLC 702, and the PLC 702 can send a command to the plurality of RFID readers to initiate the RFID read (at block 1110). After the plurality of RFID readers 706 perform the RFID read, the plurality of RFID readers 706 can send a signal the results back to the PLC 702.

In order to enter the warehouse through the warehouse door, the user may be prompted to scan/enter access information into a security access device 704 (at block 1112). If the access information is entered incorrectly (at block 1114), then the PLC 702 may send a command to the door lock/unlock mechanism 710 to keep the warehouse door locked (at block 1116). If the warehouse door is not opened (at block 1118), then the process 1100 can return to block 1112 and the Inventory Management and Access Control System 716 can command the HMI 714 to display a message to rescan/reenter access information. If the warehouse door remains locked and the user exits through the MOSS door (at block 1118), then the process 1100 can return to block 1102. If valid access information is entered into the security access device 704 (at block 1114), then the security access device 704 may send a signal to the PLC 702, and the PLC 702 may send a signal to the door lock/unlock mechanisms 710 to unlock the warehouse door and lock the MOSS door (at block 1122). The Inventory Management and Access Control System 716 may then send a command to the HMI 714 to display the list of items being returned by the user (at block 1124). It is contemplated that a live feed as well as a recording of the user's activity may be captured by a camera inside the MOSS 700 (at block 1120). User activity inside the warehouse can also be captured on additional cameras.

Referring to FIG. 12, the entry process 1100 of the multi-shopper mode may continue with the warehouse door open/close sensors 712 determining whether the warehouse door has been opened or remains closed (at block 1202). If a predetermined wait time expires (at block 1204) and the warehouse door has not been opened, then the PLC 702 can send a signal to the door lock/unlock mechanisms 710 to lock the warehouse door and unlock the MOSS door (at block 1206). Once the warehouse door is locked again, the process 1100 may return to block 1112 and the Inventory Management and Access Control System 716 may send a command to the HMI 714 to display a message to scan/enter an access information into the security access device 704.

If the warehouse door is opened (at block 1202) before the wait time expires (at block 1204), then the process will continue to block 1208. If the warehouse door is held open (at block 1208), then the door open/close sensors 712 may send a signal to the PLC 702, and the PLC 702 may sound an alarm (at block 1210). If the warehouse door is opened (at block 1202) and closed (at block 1208), then the presence detection device 708 may determine whether the user has entered the warehouse or remains in the MOSS 700 (at block 1212). If the presence detection device 708 detects the user's presence (at block 1212), then the PLC 702 may send a command to the door lock/unlock mechanisms 710 to lock the warehouse door and unlock the MOSS door (at block 1214). The Inventory Management and Access Control System 716 may then send a command to the HMI 714 to display a request for the user to scan/enter access information into the security access device 704 (at block 1216). The process 1100 may then return to block 1112.

If the presence detection device 708 does not detect the user's presence (at block 1212), then the Inventory Management and Access Control System 716 may create transactions and update inventory (at block 1218). The PLC 702 may send a command to the door lock/unlock mechanisms to lock the warehouse door and unlock the MOSS door (at block 1220) so that the MOSS 700 may be available for the next user going to or returning from the warehouse (at block 1222). This may conclude the entry process 1100 for the multi-shopper mode of the MOSS 700.

Figure 13:
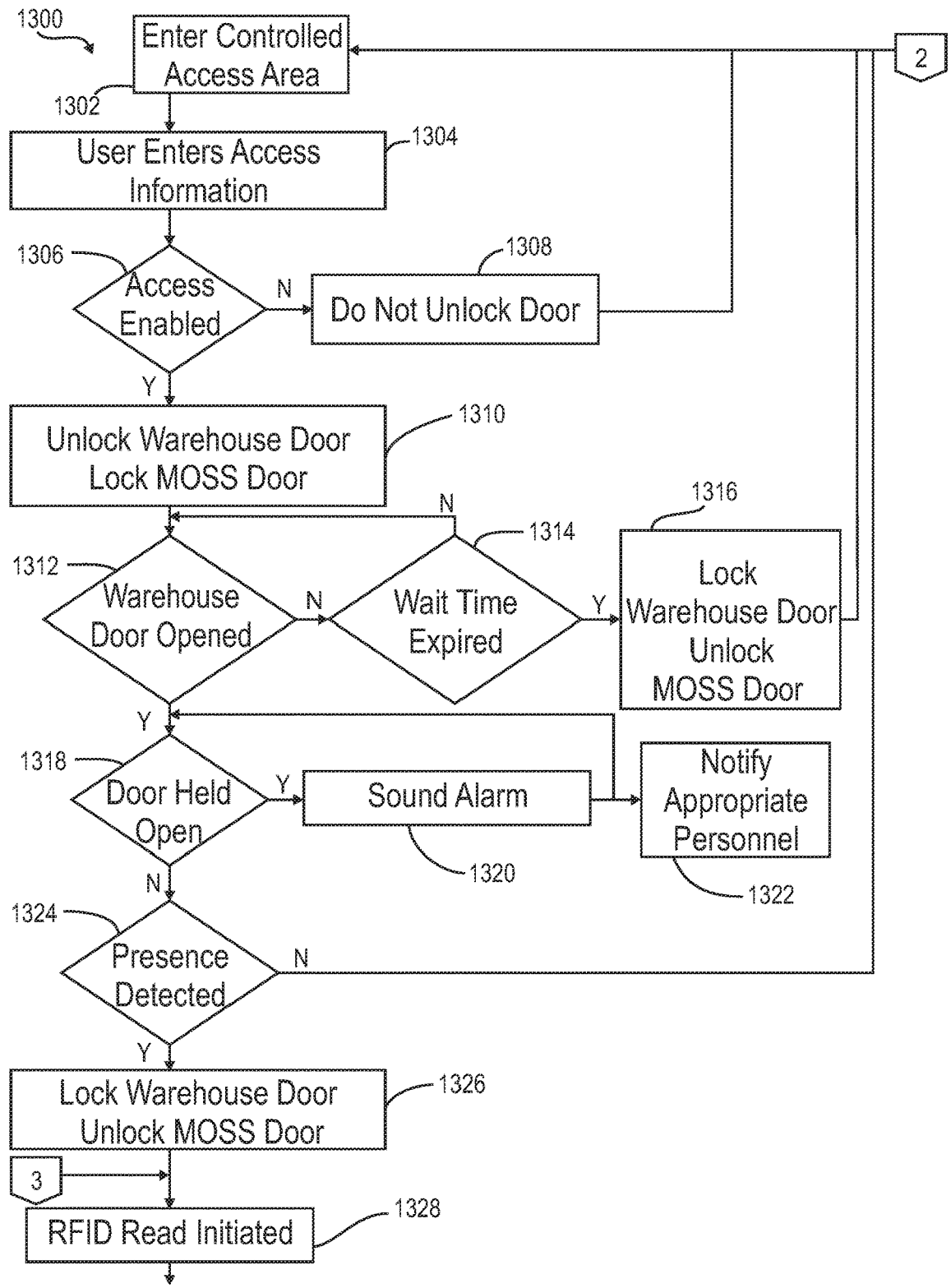
FIG. 13 is a schematic flowchart showing a first portion of the mobile security system's multi-shopper mode process for exiting the mobile security system.
Figure 14:
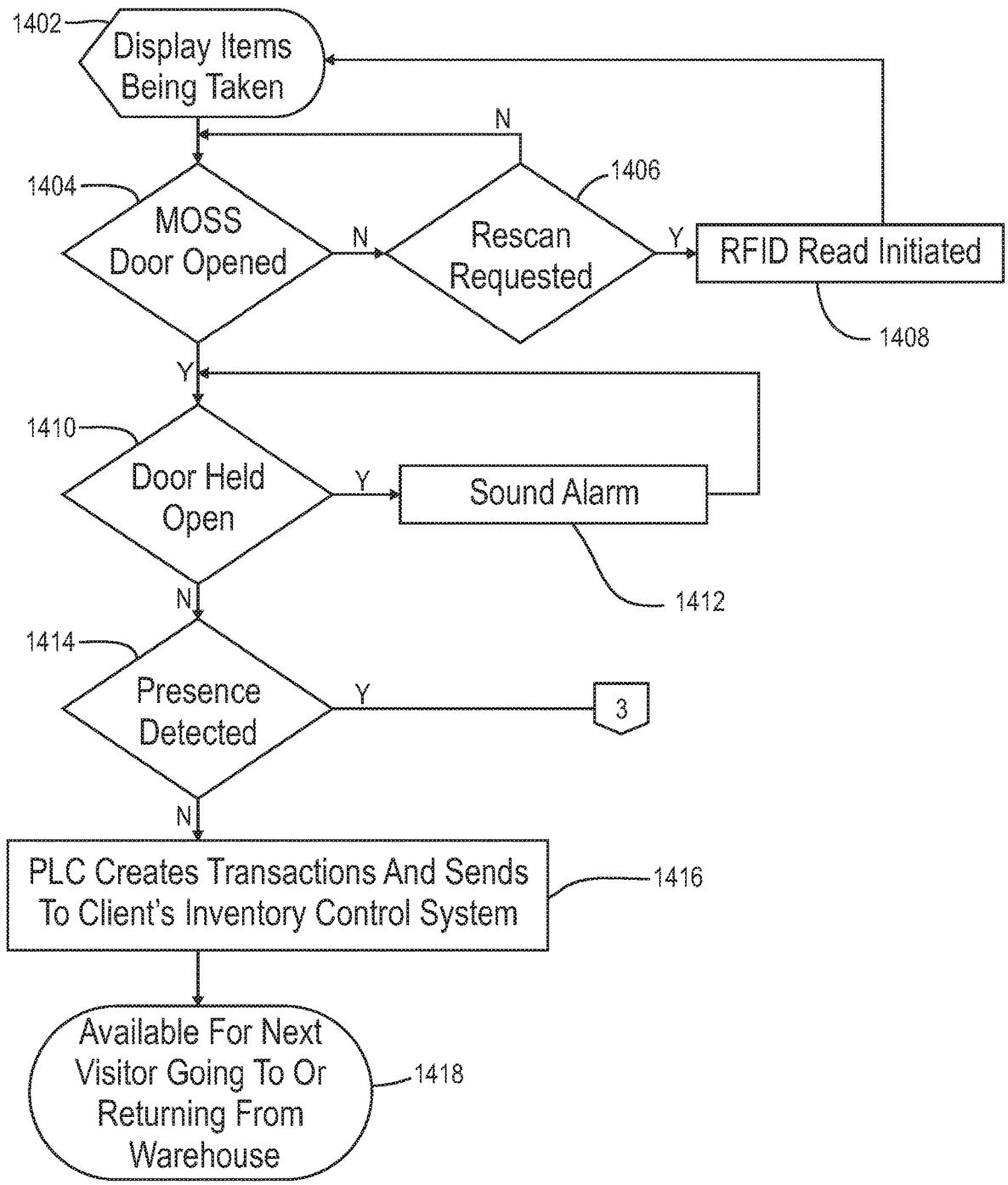
FIG. 14 is a schematic flowchart showing a second portion of the mobile security system's multi-shopper mode process for exiting the mobile security system.

FIGS. 13-14 illustrate an exit process 1300 for a user returning from the warehouse to exit the MOSS 700 in a multi-shopper mode. Referring to FIG. 13, a user may enter the controlled access area within the warehouse in front of the warehouse door (at block 1302) and scan/enter access information into another security access device 704 (at block 1304). Once the user scans/enters access information (at block 1304), the security access device 704 may send a signal to the PLC 702 and the PLC 702 may send the access information to the Inventory Management and Access Control System 716 to determine whether to enable access. The Inventory Management and Access Control System 716 may determine if the access information is valid (at block 1306). If the Inventory Management and Access Control System 716 determines that the access information is incorrect (at block 1306), then the PLC 702 may send a command to the door lock/unlock mechanism 710 to keep the warehouse door locked (at block 1308). If the warehouse door remains locked (at block 1308), then the process 1300 may return to block 1302. If the Inventory Management and Access Control System 716 determines that the access information is valid, then the PLC 702 may send a command to the door lock/unlock mechanism 710 to unlock the warehouse door (at block 1310).

If the warehouse door is not opened (at block 1312) within a predetermined wait time (at block 1314), then the PLC 702 may send a command to the door lock/unlock mechanisms 710 to lock the warehouse door and unlock the MOSS door (at block 1316). The process 1300 may then return to block 1302. If the warehouse door is opened (at block 1312) and held open (at block 1318), then the door open/close sensors 712 may send a signal to the PLC 702, and the PLC 702 may sound an alarm (at block 1320) and the Inventory Management and Access Control System 716 may notify appropriate personnel (at block 1322).

Reentry into the MOSS 700 is determined by the warehouse door being opened (at block 1312), closed (at block 1318), and the presence detection device 708 detecting the user's presence within the MOSS 700 (at block 1324). If the warehouse door is opened (at block 1312), closed (at block 1318), and the presence detection device 708 does not detect the user's presence within the MOSS 700 (at block 1324), then the process 1300 may return to block 1302. If the warehouse door is opened (at block 1312), closed (at block 1318), and the presence detection device 708 does detect the user's presence within the MOSS 700 (at block 1324), then the PLC 702 may send a command to the door lock/unlock mechanisms 710 to lock the warehouse door and unlock the MOSS door (at block 1326) and may send a command to the plurality of RFID readers 706 to initiate the RFID read (at block 1328). After the RFID read finishes, the plurality of RFID readers 706 may then send the results to the PLC 702.

Referring now to FIG. 14, the exit process 1300 may continue with the PLC 702 sending the list of RFID items to the Inventory Management and Access Control System 716 and the Inventory Management and Access Control System 716 sending a command to the HMI 714 to display the list of items that the user is taking (at block 1402). If the user disagrees with the list of items, the user may press the RESCAN button on the HMI (at block 1406). If a rescan is requested (at block 1406), then the HMI 714 may send a signal to the Inventory Management and Access Control System 716, and the PLC 702 may send a command to the plurality of RFID readers 706 to initiate another RFID read (at block 1408). The plurality of RFID readers 706 may send the results back to the PLC 702, and the PLC 702 may send the results to the Inventory Management and Access Control System 716 which then sends a command to the HMI 714 to display the list of items taken (at block 1402).

If the user agrees with the list of items, then the user may exit through the MOSS door (at block 1404). If the MOSS door is held open (at block 1410), then the door open/close sensor 712 may send a signal to the PLC 702, and the PLC 702 may sound an alarm (at block 1412). If the MOSS door is opened (at block 1404) and closed (at block 1410), but the presence detection device 708 still detects the user's presence within the MOSS 700 (at block 1414), then the process 1300 will return to block 1328 and the PLC 702 may initiate an RFID read. If the MOSS door is opened (at block 1404), closed (at block 1410), and the presence detection device 708 does not detect the user's presence within the MOSS 700 (at block 1414), then the Inventory Management and Access Control System 716 may create transactions and update inventory (at block 1416). The MOSS 700 may then be available for use by another user going into or returning from the warehouse (at block 1418). This may conclude the exit process 1300 for the multi-shopper mode of the MOSS 700.

In another embodiment of the present disclosure, a single container 100*a*, 100*b*, 100*c*, as described hereinabove in FIGS. 1-6, may be used as a portable asset dispensing device (PADD) 1500. The PADD 1500 may provide an alternate means for maintaining security, housing jobsite items, and checking jobsite items in/out. The PADD 1500 is similar to the MOSS 700 in that both perform the same basic security, check items in/out, and contain the same components and communication functions; but the PADD 1500 can be distinguished from the MOSS 700 by the fact that the PADD 1500 stores the items that a user may wish to take, rather than just being an intermediary into or out of a warehouse or separate container where the items are stored. The process for operating the PADD 1500 will become more apparent in the below description.

Figure 15:
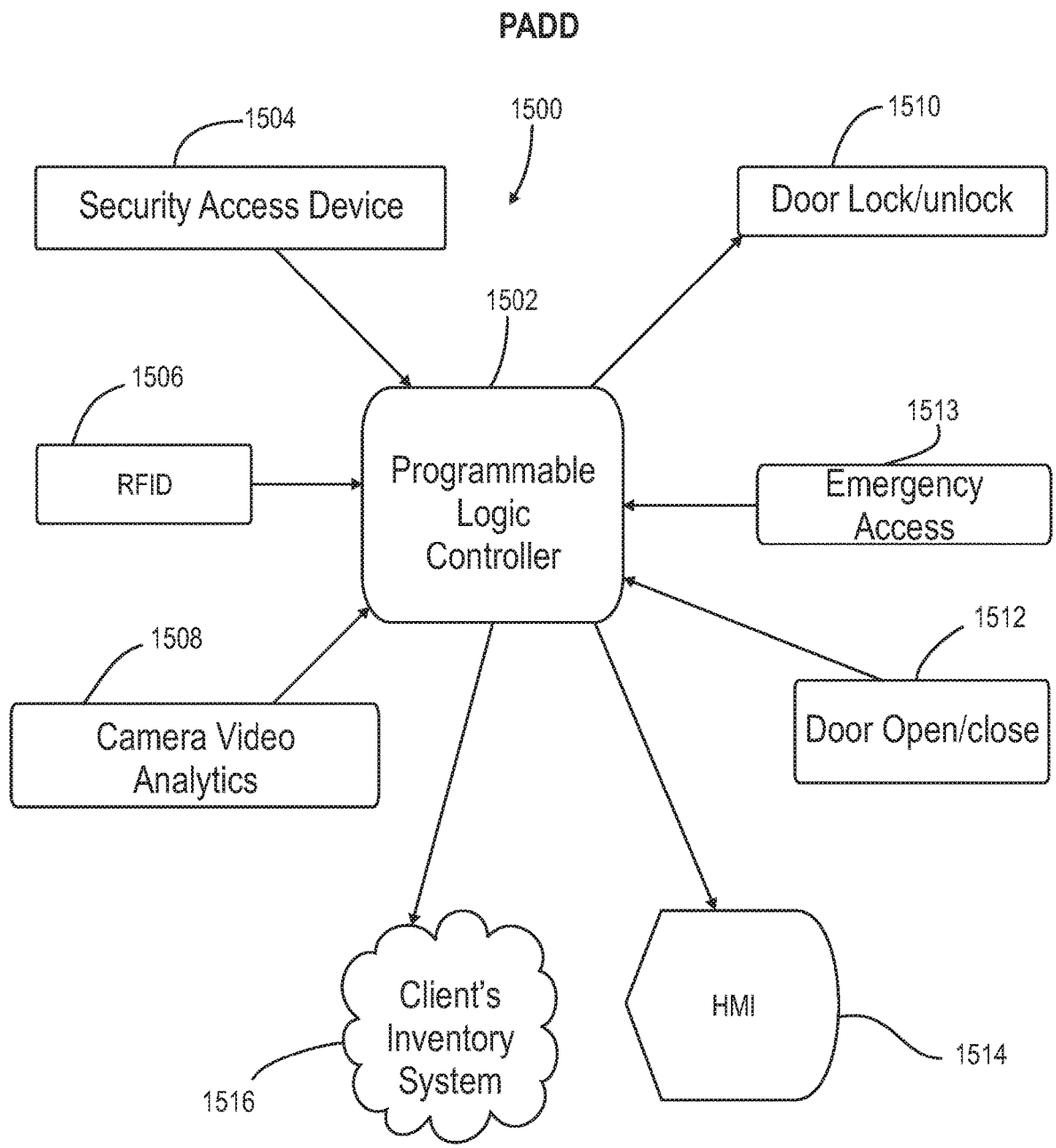
FIG. 15 is a schematic layout of the components of a portable asset dispensing device showing how they communicate.

Referring now to FIG. 15, an exemplary communication component layout for the PADD 1500 is shown. The PADD 1500 may contain the following components: a computer running an Inventory Management and Access Control System 1516, a programmable logic controller (PLC) 1502, a security access device 1504, a plurality of RFID readers and antenna 1506, a video analytics 1508, a door lock/unlock mechanism 1510, a door open/close sensor 1512, a human machine interface (HMI) 1514. The PLC 1502 can be configured to communicate with and send commands to the components.

The security access device 1504 may be configured as a scanner to read an ID card or key fob, or a pin pad for a user to input an access information code. The security access device 1504 can communicate with the PLC 1502 which in turn can communicate with the Inventory Management and Access Control System 1516 to determine the validity of the access information entered. The plurality of RFID readers 1506 may be configured to perform RFID reads in which the plurality of RFID readers 1506 determines which items a user is returning or retrieving by reading RFID tags on the items. The plurality of RFID readers 1506 can communicate the list of items to the PLC 1502 and the PLC 1502 can communicate the list of items to the Inventory Management and Access Control System 1516. The video analytics 1508 is configured to determine if a user has entered into the PADD 1500 and also to provide a live feed as well as recording of user activity. The video analytics 1508 can communicate with the Inventory Management and Access Control System 1516 about the user's presence and activity within the PADD 1500 or it can be configured to communicate with the PLC 1502. The door lock/unlock mechanism 1510 can be configured to send signals receive commands from the PLC 1502 to lock or unlock the door. The door open/close sensor 1512 can be configured to determine if the PADD door is open or closed and send that information to the PLC 1502. The HMI 1514 can be configured to be any kind of means of communication between the user and the Inventory Management and Access Control System 1516. In an exemplary embodiment, the HMI 1514 may be a touch screen.

Figure 16:
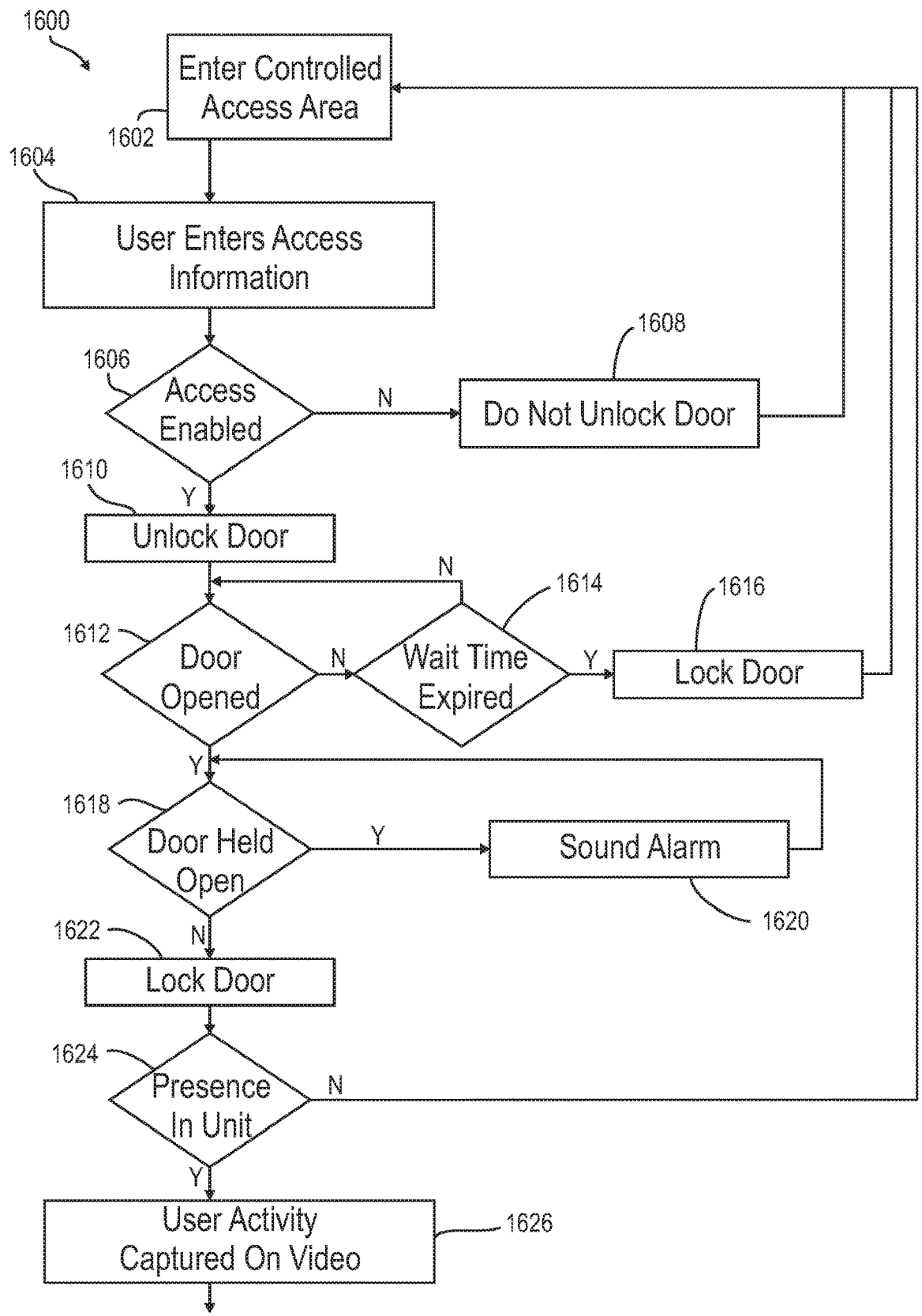
FIG. 16 is a schematic flowchart showing a first portion of the portable asset dispensing device's item retrieval/return process.

Referring to FIG. 16, a process 1600 for accessing and using the PADD 1500 is shown. A user may enter a controlled access area in front of the PADD 1500 (at block 1602) and scan/enter access information into the security access device 1504 (at block 1604). The security access device 1504 may signal to the PLC 1502, and the PLC 1502 may send the access information to the Inventory Management and Access Control System 1516 which may determine whether the access information is valid (at block 1606). If the Inventory Management and Access Control System 1516 determines that the access information is invalid (at block 1606), then the PLC 1502 will signal to the door lock/unlock mechanism 1510 to keep the door locked and the process 1600 will return to block 1604. If the Inventory Management and Access Control System 1516 determines that the access information is valid, then the PLC 1502 can grant access (at block 1606) and may send a command to the door lock/unlock mechanism to unlock the door (at block 1610).

Once the door is unlocked (at block 1610), the door open/close sensor 1512 can detect whether the door is opened or closed (at block 1612). If the user does not open the door before a predetermined wait time has expired (at block 1614), then the PLC 1502 can send a command to the door lock/unlock mechanism 1510 to lock the door (at block 1616) and the process 1600 can return to block 1604. If the door is opened (at block 1612) and held open (at block 1618), then the door open/close sensor 1512 can send a signal to the PLC 1502, and the PLC 1502 may sound an alarm (at block 1620). Once the door open/close sensor 1512 sends a signal to the PLC 1502 that the door has opened (at block 1612) and closed (at block 1618), then the PLC 1502 can signal to the door lock/unlock mechanism 1510 to lock the door (at block 1622).

The video analytics 1508 can determine if the user has entered into the PADD 1500 (at block 1624). If the user has not entered into the PADD 1500 (at block 1624), then the video analytics 1508 can send a signal to the Inventory Management and Access Control System 1516 that the user is not present in the PADD 1500 and the process 1600 may return to block 1604. If the user has entered the PADD 1500

(at block 1624), then the video analytics 1508 may capture the user activity using a live feed and recording (at block 1626).

Figure 17:
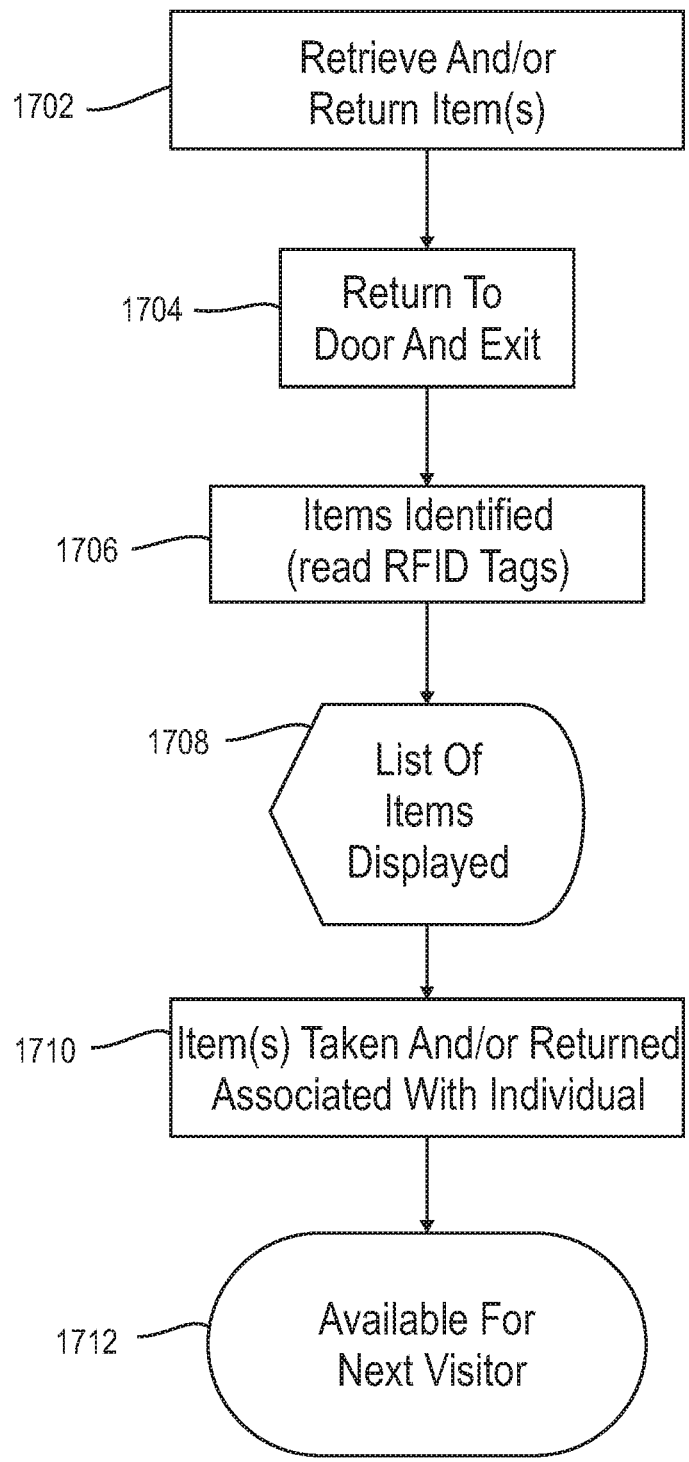
FIG. 17 is a schematic flowchart showing a second portion of the portable asset dispensing device's item retrieval/return process.

Referring to FIG. 17, the user is permitted to retrieve and/or return items with RFID tags that can be stored on shelves or hanging from hooks within the PADD 1500 (at block 1702). Once the user has finished retrieving and/or returning items, the user may return to the door and exit the PADD 1500 (at block 1704). The door open/close sensor 1512 may send a signal to the PLC 1502 indicating that the door has been opened, and the PLC 1502 may send a read request to the plurality of RFID readers 1506. The plurality of RFID readers 1506 perform a read of the PADD 1500 and create a list of items within the PADD 1500. The plurality of RFID readers 1506 may send the list of items after the user's visit to the PLC 1502 (at block 1706) and the PLC 1502 may send the list of items to the Inventory Management and Access Control System 1516. The Inventory Management and Access Control System 1516 may then determine the items the user has retrieved and/or returned by comparing the list of items in inventory with the list of items after the user's visit.

The Inventory Management and Access Control System 1516 may send a command to the HMI 1514 to display the list of items (at block 1708). The HMI 1514 may display the list of items for the user to review. If the user disagrees with the list of items, the user can add a note using a touch screen keyboard on the HMI 1514. The HMI 1514 may send the list of items and any notes entered to the Inventory Management and Access Control System 1516. The Inventory Management and Access Control System 1516 creates transactions and updates inventory (at block 1710) and the PADD 1500 may be available for another user to enter (at block 1712).

Figure 18:
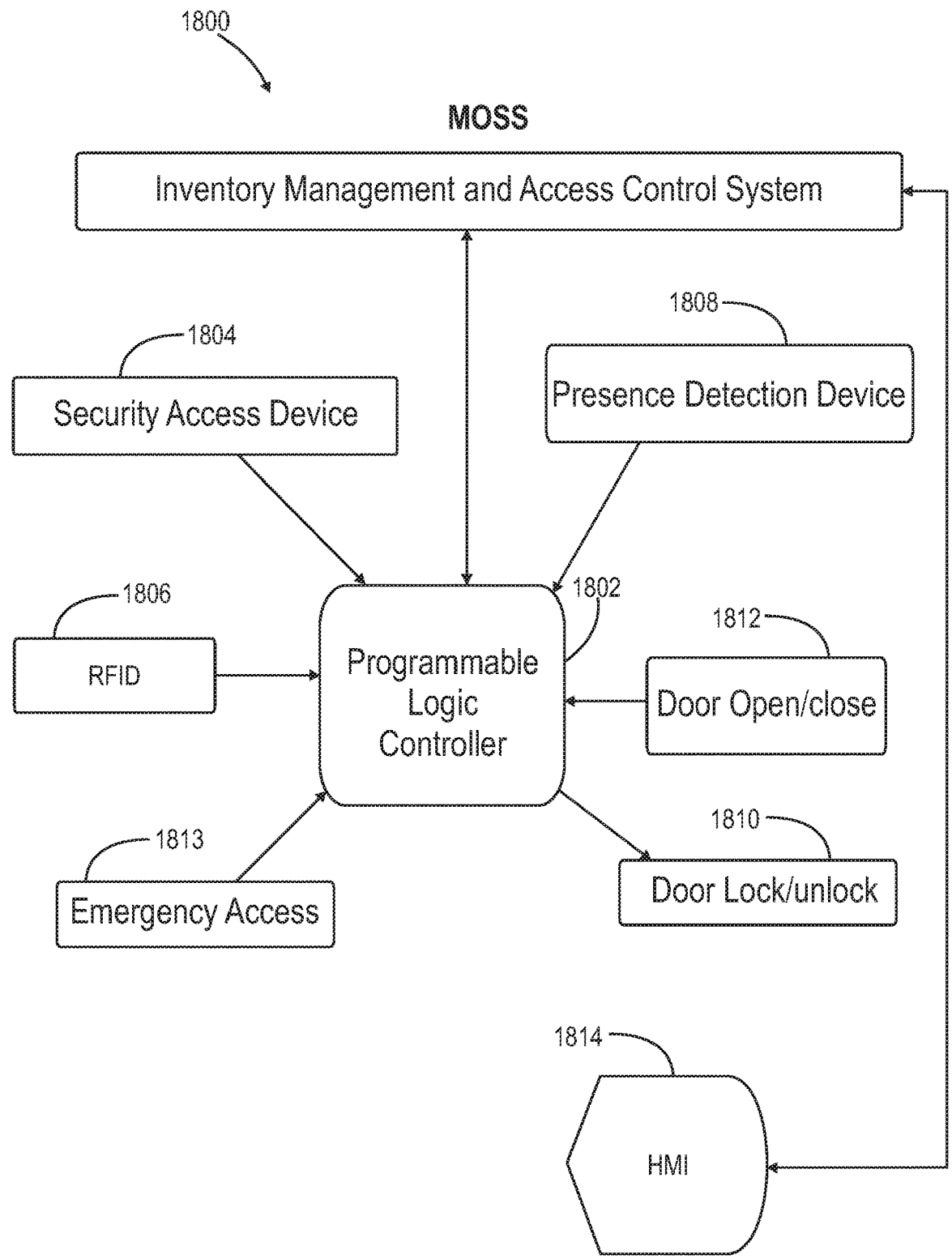
FIG. 18 is another schematic layout of the components of a mobile security system showing how they communicate.

An alternative embodiment of the system shown in FIG. 7 is illustrated in FIG. 18. Here, the MOSS is illustrated includes a PLC 1802 which is capable of communicating with a security access device 1804, one or more RFID readers 1806, a presence detection device 1808, a door lock/unlock mechanism 1810, a door open/close sensor 1812, and a computer running an Inventory Management and Access Control System 1800 which communicates with a human machine interface (HMI) 1814. For emergency entry into the storage facility, an emergency switch 1813 may be attached to the MOSS and is in communication with the PLC 1802. If the user activates the emergency switch 1813, then the emergency switch 1813 can send a signal to the PLC 1802, and the PLC 1802 can send an unlock command to the door lock/unlock mechanism 1810 and sound an alarm. The processes of the MOSS is similar to that described above with respect to FIGS. 8-10.

Figure 19:
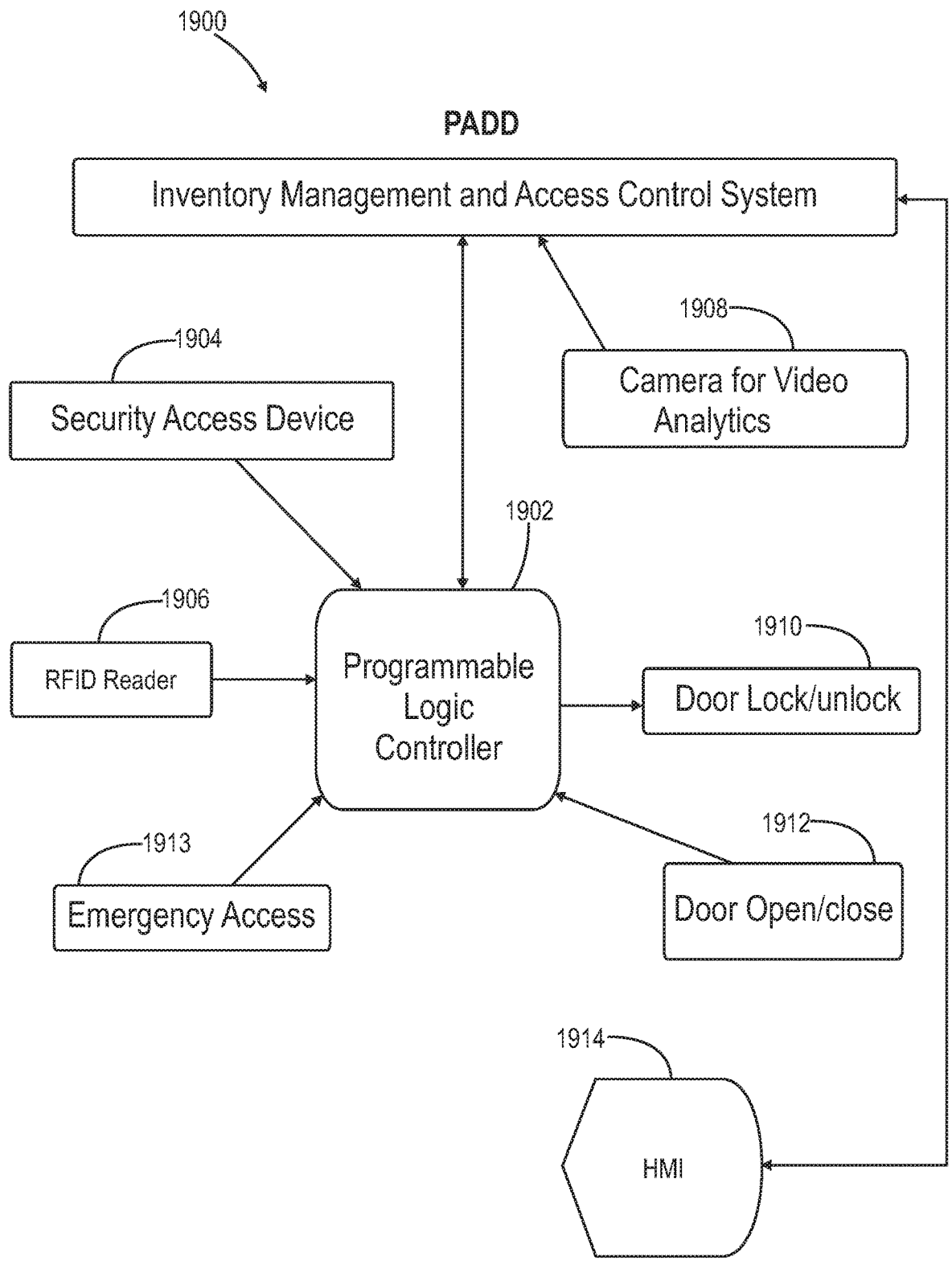
FIG. 19 is another schematic layout of the components of a portable asset dispensing device showing how they communicate.

In FIG. 19, an alternative embodiment of a communication component layout for the PADD is shown. The PADD may contain the following components: a computer running an Inventory Management and Access Control System 1900, a programmable logic controller (PLC) 1902, a security access device 1904, one or more RFID readers 1906, a camera for video analytics 1908, a door lock/unlock mechanism 1910, a door open/close sensor 1912, and a human machine interface (HMI) 1914. The PLC 1902 can be configured to communicate with and send commands to the components, and the HMI 1914 is configured to be in communication with the Inventory Management and Access Control System 1900.

The security access device 1904 may be configured as a scanner to read an ID card or key fob, or a pin pad for a user to input an access information code. The security access device 1904 can communicate with the PLC 1902 which in turn can communicate with the Inventory Management and Access Control System 1900 to determine the validity of the access information entered. The plurality of RFID readers 1906 may be configured to perform RFID reads in which the plurality of RFID readers 1906 determines which items a user is returning or retrieving by reading RFID tags on the items. The plurality of RFID readers 1906 can communicate the list of items to the PLC 1902 and the PLC 1902 can communicate the list of items to the Inventory Management and Access Control System 1900.

The video analytics 1908 is configured to determine if a user has entered into the PADD and also to provide a live feed as well as recording of user activity. The video analytics 1908 can communicate with the Inventory Management and Access Control System 1900 about the user's presence and activity within the PADD or it can be configured to communicate with the PLC 1902.

The door lock/unlock mechanism 1910 can be configured to send signals receive commands from the PLC 1902 to lock or unlock the door. The door open/close sensor 1912 can be configured to determine if the PADD door is open or closed and send that information to the PLC 1902. The HMI 1914 can be configured to be any kind of means of communication between the user and the Inventory Management and Access Control System 1900. In an exemplary embodiment, the HMI 1914 may be a touch screen.

For emergency entry, an emergency access switch 1913 may be provided to be in communication with the PLC 1802. If the user activates the emergency switch 1913, then the emergency switch 1913 can send a signal to the PLC 1902, and the PLC 1902 can send an unlock command to the door lock/unlock mechanism 1910 and sound an alarm.

The processes of the PADD system shown in FIG. 19 is similar to that described above with respect to FIGS. 16-17.

While an exemplary embodiment incorporating the principles of the present application has been disclosed hereinabove, the present application is not limited to the disclosed embodiments. Instead, this application is intended to cover any variations, uses, or adaptations of the application using its general principles. Further, this application is intended to cover such departures from the present disclosure as come within known or customary practice in the art to which this present application pertains and which fall within the limits of the appended claims.

The terminology used herein is for the purpose of describing particular illustrative embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:
1. A portable asset dispensing device comprising:
   a container configured to be moved to a plurality of locations, the container including an interior and an end;

a door positioned at the end of the container, the door having a locking mechanism, and the door separating the interior of the container from an exterior of the container;
a security access device disposed at the end and configured to accept only access information to identify an authorized user;
a controller for controlling access into the container and tracking a plurality of items within the interior of the container; and
a plurality of radio frequency identification (RFID) readers disposed within the interior of the container, the plurality of RFID readers configured to detect RFID tags located on the plurality of items within the interior of the container to identify which items are removed or added to the interior of the container after the user exits the interior of the container and communicate the identified items to the controller;
wherein, the controller identifies an authorized user based on information entered on the security access device and sends a command to the locking mechanism to unlock the door and permit access into the interior of the container to the authorized user;
further wherein, the controller associates one or more items from the plurality of items that the authorized user removed from or returned to the container with the authorized user based on the plurality of items detected by the RFID readers in the interior of the container after the authorized user exits the interior of the container;
further wherein, the controller identifies the one or more items removed from or returned to the interior of the container by the authorized user by comparing: (a) the plurality of items detected by the RFID readers in the interior of the container before the authorized user entered information on the security access device to, (b) the plurality of items detected by the RFID readers in the interior of the container after the authorized user exits the interior of the container.

2. The portable asset dispensing device of claim 1, further comprising an HVAC system operable to control an environment in the interior of the container.

3. The portable asset dispensing device of claim 1, further comprising an emergency switch having an alarm, the emergency switch configured to sound the alarm and permit emergency access into the interior of the container by causing the locking mechanism to unlock the door when the emergency switch is triggered.

4. The portable asset dispensing device of claim 1, further comprising a door sensor in electronic communication with the controller, the door sensor configured to communicate to the controller whether the door is open or closed.

5. The portable asset dispensing device of claim 4, wherein the controller commands an alarm to sound when the door sensor reports that the door has been open for a predetermined amount of time.

6. The portable asset dispensing device of claim 1, further comprising a human machine interface adaptable to provide instructions and communicate information to the user.

7. The portable asset dispensing device of claim 1, further comprising a presence detection device in electronic communication with the controller, wherein the presence detection device communicates to the controller when the user is present within the portable asset dispensing device.

8. The portable asset dispensing device of claim 1, further comprising an inventory system, wherein the controller sends the list of items taken or returned by each authorized user to the inventory system.

9. A method of tracking inventory in a mobile container comprising:
providing the mobile container having an interior, an end, a door separating the interior of the container from an exterior of the container, an access point disposed in the end, a controller, a plurality of RFID readers disposed within the interior of the container, a security access device, and a plurality of items disposed within the interior each having a RFID tag;
performing a first RFID scan of the plurality of items disposed within the interior of the container;
receiving only access information at the security access device from an authorized user;
allowing access to the interior of the container via the access point to the authorized user;
detecting when the authorized user exits the interior of the container through the access point;
performing a second RFID scan of the plurality of items disposed within the interior of the container after the authorized user exits the interior of the container to identify which items are removed or added to the interior of the container after the user exits the interior of the container;
comparing the first RFID scan to the second RFID scan;
determining which of the plurality of items the authorized user returned to or retrieved from the container based on the comparing step; and
associating one or more of the plurality of items returned to or retrieved from the container to the authorized user.

10. The method of claim 9, further comprising sensing the presence of the authorized user in the container.

11. The method of claim 10, further comprising enabling a locking mechanism to prohibit access to the interior of the container after the sensing step.

12. The method of claim 10, wherein the sensing step is performed by a video camera.

13. The method of claim 9, further comprising;
providing a door sensor; and
sensing when the door is open and when it is closed.

14. The method of claim 12, further comprising sounding an alarm until the door is closed when the door is held open for a predetermined period of time.

15. The method of claim 9, further comprising:
providing a user interface; and
displaying the transaction list of items to the authorized user on the user interface.

16. The method of claim 15, further comprising:
allowing the authorized user to request a third RFID scan if the authorized user disagrees with the transaction list;
performing the third RFID scan of the plurality of items disposed within the interior of the container;
comparing the first RFID scan with the third RFID scan;
determining which of the plurality of items the authorized user returned to or retrieved from the container based on the comparing step; and
associating one or more of the plurality of items returned to or retrieved from the container to the authorized user.

17. A system of monitoring inventory comprising:
a mobile container having at least one door with a locking mechanism, the door separating the an interior of the mobile container from an exterior of the mobile container;
a controller;
a security access device disposed adjacent to the at least one door and configured to accept only access information;

a plurality of items, each item of the plurality of items having its own RFID tag disposed within the container; and a plurality of RFID readers disposed within the container to identify which items are removed or added to the interior of the container after the user exits the interior of the container;

wherein, the controller sends commands to unlock the door when an authorized user provides proper access information at the security access device;

further wherein, the controller commands the plurality of RFID readers to perform a first RFID read before the authorized user enters the container to create a first list of items from the plurality of items and after the authorized user leaves the container to create a second list of items;

further wherein, the controller compares the first list of items to the second list of items to determine which of the plurality of items the authorized user returned or retrieved;

further wherein, the controller associates the items returned and retrieved with the authorized user.

18. The system of claim 17 further comprising a remote inventory system, wherein the controller sends a list of items associated with the authorized user to the inventory system.

19. The system of claim 17 further comprising an emergency switch, wherein when the authorized user activates the emergency switch, the controller sends a command to the locking mechanism on the door to unlock the door and allow emergency access into the container.

20. A method of tracking inventory comprising:

providing a container configured to be moved to a plurality of locations, the container including an interior and a door having a locking mechanism, and the door separating the interior of the container from an exterior of the container;

detecting RFID tags located on the plurality of items within the interior of the container with a plurality of radio frequency identification (RFID) readers disposed within the interior of the container to identify which items are removed or added to the interior of the container after the user exits the interior of the container;

identifying only an authorized user based on information entered on a security access device disposed at the end of the container;

sending a command to the locking mechanism to unlock the door and permit access into the interior of the container to the authorized user;

comparing: (a) the plurality of items detected by the RFID readers in the interior of the container before the authorized user entered information on the security access device to, (b) the plurality of items detected by the RFID readers in the interior of the container after the authorized user exits the interior of the container.

* * * * *